(12) United States Patent
Liu et al.

(10) Patent No.: US 12,342,318 B2
(45) Date of Patent: Jun. 24, 2025

(54) PAGING EARLY INDICATION FOR MULTICAST GROUP NOTIFICATION

(71) Applicant: QUALCOMM Incorporated, San Diego, CA (US)

(72) Inventors: Le Liu, Fremont, CA (US); Alberto Rico Alvarino, San Diego, CA (US); Prasad Reddy Kadiri, San Diego, CA (US); Huilin Xu, Temecula, CA (US); Linhai He, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 17/383,737

(22) Filed: Jul. 23, 2021

(65) Prior Publication Data

US 2023/0023161 A1    Jan. 26, 2023

(51) Int. Cl.
*H04W 52/02*     (2009.01)
*H04W 8/24*      (2009.01)
*H04W 24/08*     (2009.01)
*H04W 68/00*     (2009.01)
*H04W 72/121*    (2023.01)
*H04W 72/1263*   (2023.01)

(52) U.S. Cl.
CPC .......... *H04W 68/005* (2013.01); *H04W 8/24* (2013.01); *H04W 24/08* (2013.01); *H04W 72/121* (2013.01); *H04W 72/1263* (2013.01)

(58) Field of Classification Search
None
See application file for complete search history.

(56) References Cited

U.S. PATENT DOCUMENTS

| | | |
|---|---|---|
| 2012/0122495 A1 | 5/2012 | Weng et al. |
| 2013/0242848 A1* | 9/2013 | Kim ............ H04W 4/06 370/312 |
| 2013/0252643 A1 | 9/2013 | Park et al. |
| 2020/0344688 A1* | 10/2020 | Lv ............ H04J 3/0682 |

(Continued)

OTHER PUBLICATIONS

International Search Report and Written Opinion—PCT/US2022/034169—ISA/EPO—Oct. 20, 2022.

(Continued)

*Primary Examiner* — Gary Lafontant
(74) *Attorney, Agent, or Firm* — Holland & Hart LLP

(57) ABSTRACT

Methods, systems, and devices for wireless communications are described. A user equipment (UE) may receive, from a base station, control signaling that indicates one or more parameters pertaining to reception of paging early indications (PEIs). The UE may receive a PEI from the base station in accordance with the one or more parameters. The UE may determine, based on the PEI, whether the UE is scheduled to receive a multicast paging message from the base station in a subsequent paging occasion (PO). If the UE is scheduled to receive a multicast paging message, the UE may monitor for the multicast paging message in the subsequent PO. Otherwise, the UE may enter a low-power state during the subsequent PO, which may result in greater power savings at the UE. Aspects of the present disclosure may provide for improved multicast paging operations between the UE and the base station.

26 Claims, 23 Drawing Sheets

(56) References Cited

U.S. PATENT DOCUMENTS

2022/0046582 A1* 2/2022 Shrivastava .......... H04W 68/02
2023/0015708 A1* 1/2023 Gurumoorthy ....... H04W 68/02

OTHER PUBLICATIONS

Mediatek Inc: "Paging Enhancements for UE Power Saving in NR", R2-2008361, 3GPP TSG-RAN WG2 Meeting #111 electronic, 3rd Generation Partnership Project, Mobile Competence Centre, 650, Route Des Lucioles, F-06921 Sophia-Antipolis Cedex, France, vol. RAN WG2, No. Online, Aug. 17, 2020-Aug. 28, 2020, Aug. 14, 2020, XP051920674, pp. 1-8, paragraph [03.1]-paragraph [0004].

* cited by examiner

PAGING EARLY INDICATION FOR MULTICAST GROUP NOTIFICATION

FIELD OF TECHNOLOGY

The following relates to wireless communications, including paging early indication (PEI) for multicast group notification.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may receive a paging early indication (PEI) indicating whether the UE is scheduled to receive a paging message in an upcoming paging occasion (PO). In some cases, however, conventional PEI signaling techniques may be deficient.

SUMMARY

The described techniques relate to improved methods, systems, devices, and apparatuses that support paging early indication (PEI) for multicast group notification. Generally, the described techniques provide for improved multicast paging operations between a base station and a group of user equipments (UEs). In some examples, a base station may transmit control signaling that indicates one or more parameters pertaining to reception of multicast PEIs, and may transmit a multicast PEI to a group of UEs in accordance with the control signaling. The multicast PEI may indicate that the group of UEs is scheduled to receive a multicast paging message from the base station in a subsequent paging occasion (PO). The group of UEs may decode the multicast PEI based on the control signaling and may monitor for the multicast paging message in the subsequent PO based on decoding the multicast PEI.

A method for wireless communications at a UE is described. The method may include receiving, from a base station, control signaling that indicates one or more parameters pertaining to reception of PEIs at the UE, receiving a PEI from the base station in accordance with the one or more parameters, determining, based on the one or more parameters, that at least a part of the PEI pertains to a group of UEs that are subscribed to one or more multicast services, where the UE is one of the group of UEs, and monitoring for a multicast paging message from the base station based on the PEI pertaining to the group of UEs.

An apparatus for wireless communications at a UE is described. The apparatus may include a processor, memory coupled with the processor, and instructions stored in the memory. The instructions may be executable by the processor to cause the apparatus to receive, from a base station, control signaling that indicates one or more parameters pertaining to reception of PEIs at the UE, receive a PEI from the base station in accordance with the one or more parameters, determine, based on the one or more parameters, that at least a part of the PEI pertains to a group of UEs that are subscribed to one or more multicast services, where the UE is one of the group of UEs, and monitor for a multicast paging message from the base station based on the PEI pertaining to the group of UEs.

Another apparatus for wireless communications at a UE is described. The apparatus may include means for receiving, from a base station, control signaling that indicates one or more parameters pertaining to reception of PEIs at the UE, means for receiving a PEI from the base station in accordance with the one or more parameters, means for determining, based on the one or more parameters, that at least a part of the PEI pertains to a group of UEs that are subscribed to one or more multicast services, where the UE is one of the group of UEs, and means for monitoring for a multicast paging message from the base station based on the PEI pertaining to the group of UEs.

A non-transitory computer-readable medium storing code for wireless communications at a UE is described. The code may include instructions executable by a processor to receive, from a base station, control signaling that indicates one or more parameters pertaining to reception of PEIs at the UE, receive a PEI from the base station in accordance with the one or more parameters, determine, based on the one or more parameters, that at least a part of the PEI pertains to a group of UEs that are subscribed to one or more multicast services, where the UE is one of the group of UEs, and monitor for a multicast paging message from the base station based on the PEI pertaining to the group of UEs.

In some examples of the method, apparatuses, and non-transitory computer-readable medium described herein, determining that at least a part of the PEI pertains to the group of UEs may include operations, features, means, or instructions for identifying, based on the one or more parameters, one or more bits in the PEI that indicate the multicast paging message and determining, based on the one or more bits, that the group of UEs is scheduled to receive the multicast paging message from the base station during a PO associated with the multicast paging message.

In some examples of the method, apparatuses, and non-transitory computer-readable medium described herein, receiving the PEI may include operations, features, means, or instructions for receiving, from the base station, one or more broadcast messages in a common frequency resource (CFR) and receiving the PEI in a control resource set (CORESET) of the CFR, where determining that at least a part of the PEI pertains to the group of UEs may be based on receiving the PEI in the CORESET.

In some examples of the method, apparatuses, and non-transitory computer-readable medium described herein, determining that at least a part of the PEI pertains to the group of UEs may include operations, features, means, or instructions for decoding the PEI based on a radio network temporary identifier (RNTI) associated with the multicast paging message and determining, based on decoding the PEI, that the group of UEs may be scheduled to receive the multicast paging message from the base station in a PO associated with the multicast paging message.

Some examples of the method, apparatuses, and non-transitory computer-readable medium described herein may further include operations, features, means, or instructions for determining, based on the one or more parameters, that at least a part of the PEI pertains to a second paging message for a second UE in the group of UEs.

In some examples of the method, apparatuses, and non-transitory computer-readable medium described herein, determining that at least a part of the PEI pertains to the group of UEs may include operations, features, means, or instructions for identifying, based on the one or more parameters, a first entry in the PEI that indicates the multicast paging message, a second entry in the PEI that indicates the second paging message, or both and determining, based on the first entry, that the group of UEs may be scheduled to receive the multicast paging message from the base station during a PO associated with the multicast paging message.

In some examples of the method, apparatuses, and non-transitory computer-readable medium described herein, receiving the PEI may include operations, features, means, or instructions for receiving the PEI in a first monitoring occasion (MO) associated with the multicast paging message, where the first MO may be different from a second MO associated with the second paging message.

In some examples of the method, apparatuses, and non-transitory computer-readable medium described herein, receiving the PEI may include operations, features, means, or instructions for receiving the PEI in a first set of symbols associated with the multicast paging message, where the first set of symbols may be different from a second set of symbols associated with the second paging message, and where the first set of symbols and the second set of symbols correspond to a same MO.

In some examples of the method, apparatuses, and non-transitory computer-readable medium described herein, determining that at least a part of the PEI pertains to the group of UEs may include operations, features, means, or instructions for determining that the group of UEs is scheduled to receive the multicast paging message from the base station based on receiving the PEI in the first set of symbols associated with the multicast paging message.

In some examples of the method, apparatuses, and non-transitory computer-readable medium described herein, receiving the PEI may include operations, features, means, or instructions for receiving, from the base station, one or more synchronization signals or reference signals indicating the PEI, where determining that at least a part of the PEI pertains to the group of UEs is based on a sequence associated with the one or more synchronization signals or reference signals.

In some examples of the method, apparatuses, and non-transitory computer-readable medium described herein, receiving the PEI may include operations, features, means, or instructions for receiving a physical downlink control channel (PDCCH) transmission including the PEI.

Some examples of the method, apparatuses, and non-transitory computer-readable medium described herein may further include operations, features, means, or instructions for receiving the multicast paging message from the base station in a PO associated with the multicast paging message, where the multicast paging message includes a multicast activation notification.

Some examples of the method, apparatuses, and non-transitory computer-readable medium described herein may further include operations, features, means, or instructions for receiving a multicast transmission from the base station based on receiving the multicast paging message in the PO associated with the multicast paging message.

In some examples of the method, apparatuses, and non-transitory computer-readable medium described herein, receiving the control signaling may include operations, features, means, or instructions for receiving, from the base station, a system information block (SIB) or a multicast control channel (MCCH) transmission that indicates the one or more parameters.

In some examples of the method, apparatuses, and non-transitory computer-readable medium described herein, the UE may be in an idle state or an inactive state.

Some examples of the method, apparatuses, and non-transitory computer-readable medium described herein may further include operations, features, means, or instructions for transmitting, to the base station, a capability message indicating a capability of the UE to receive PEIs for multicast paging messages, where receiving the PEI from the base station is based on the capability message.

A method for wireless communications at a base station is described. The method may include transmitting control signaling that indicates one or more parameters pertaining to reception of PEIs, transmitting a PEI in accordance with the one or more parameters, where at least a part of the PEI pertains to a group of UEs that are subscribed to one or more multicast services, and transmitting a multicast paging message to the group of UEs in accordance with the PEI.

An apparatus for wireless communications at a base station is described. The apparatus may include a processor, memory coupled with the processor, and instructions stored in the memory. The instructions may be executable by the processor to cause the apparatus to transmit control signaling that indicates one or more parameters pertaining to reception of PEIs, transmit a PEI in accordance with the one or more parameters, where at least a part of the PEI pertains to a group of UEs that are subscribed to one or more multicast services, and transmit a multicast paging message to the group of UEs in accordance with the PEI.

Another apparatus for wireless communications at a base station is described. The apparatus may include means for transmitting control signaling that indicates one or more parameters pertaining to reception of PEIs, means for transmitting a PEI in accordance with the one or more parameters, where at least a part of the PEI pertains to a group of UEs that are subscribed to one or more multicast services, and means for transmitting a multicast paging message to the group of UEs in accordance with the PEI.

A non-transitory computer-readable medium storing code for wireless communications at a base station is described. The code may include instructions executable by a processor to transmit control signaling that indicates one or more parameters pertaining to reception of PEIs, transmit a PEI in accordance with the one or more parameters, where at least a part of the PEI pertains to a group of UEs that are subscribed to one or more multicast services, and transmit a multicast paging message to the group of UEs in accordance with the PEI.

In some examples of the method, apparatuses, and non-transitory computer-readable medium described herein, transmitting the PEI may include operations, features, means, or instructions for transmitting one or more broadcast messages in a CFR and transmitting the PEI in a CORESET of the CFR.

In some examples of the method, apparatuses, and non-transitory computer-readable medium described herein, at least a part of the PEI pertains to a second paging message for a UE in the group of UEs.

In some examples of the method, apparatuses, and non-transitory computer-readable medium described herein, transmitting the PEI may include operations, features, means, or instructions for transmitting the PEI in a first MO associated with the multicast paging message, where the first MO may be different from a second MO associated with the second paging message.

In some examples of the method, apparatuses, and non-transitory computer-readable medium described herein, transmitting the PEI may include operations, features, means, or instructions for transmitting the PEI in a first set of symbols associated with the multicast paging message, where the first set of symbols may be different from a second set of symbols associated with the second paging message, and where the first set of symbols and the second set of symbols correspond to a same MO.

In some examples of the method, apparatuses, and non-transitory computer-readable medium described herein, transmitting the PEI may include operations, features, means, or instructions for transmitting the PEI via a PDCCH, where the PEI includes a first set of bits associated with the multicast paging message, a first entry associated with the multicast paging message, a second set of bits associated with the second paging message, a second entry associated with the second paging message, or a combination thereof.

Some examples of the method, apparatuses, and non-transitory computer-readable medium described herein may further include operations, features, means, or instructions for encoding the PEI with a RNTI associated with the multicast paging message, where transmitting the PEI is based on encoding the PEI.

In some examples of the method, apparatuses, and non-transitory computer-readable medium described herein, transmitting the multicast paging message may include operations, features, means, or instructions for transmitting the multicast paging message to the group of UEs in a PO associated with the multicast paging message, where the multicast paging message includes a multicast activation notification.

Some examples of the method, apparatuses, and non-transitory computer-readable medium described herein may further include operations, features, means, or instructions for transmitting a multicast transmission to the group of UEs in accordance with the multicast paging message.

In some examples of the method, apparatuses, and non-transitory computer-readable medium described herein, transmitting the control signaling may include operations, features, means, or instructions for transmitting a SIB or an MCCH transmission that includes an indication of the one or more parameters, an indication to enable or disable PEIs for multicast paging messages, or both.

DETAILED DESCRIPTION

Figure 1:
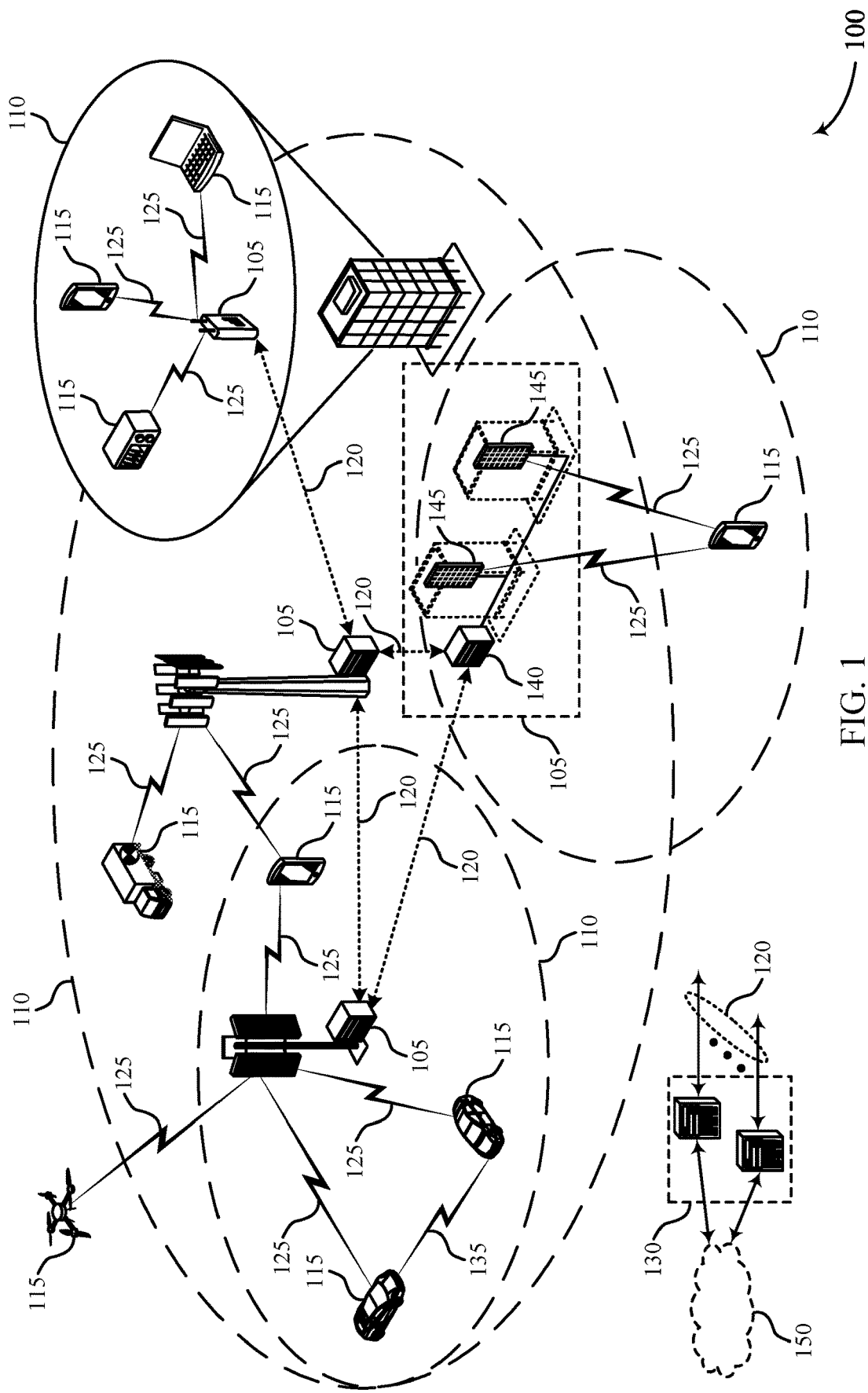
FIG. 1 illustrates an example of a wireless communications system that supports paging early indication (PEI) for multicast group notification in accordance with aspects of the present disclosure.

In some wireless communications system, a base station may transmit a paging early indication (PEI) to a user equipment (UE) that is in an idle or inactive state. The PEI may indicate whether the UE is scheduled to receive a paging message from the base station in a subsequent paging occasion (PO). Specifically, the PEI may indicate whether a paging sub-group of the UE is scheduled to receive paging messages in the subsequent PO. If the UE is scheduled to receive a paging message from the base station, the UE may monitor for the paging message during the subsequent PO. Alternatively, if the PEI does not indicate the paging sub-group of the UE (e.g., if the UE is not scheduled to receive a paging message), the UE may refrain from monitoring for paging messages during the subsequent PO, which may reduce power consumption at the UE.

The base station may use PEIs to indicate paging messages for specific UEs. In some cases, however, the base station may also use PEIs for multicast paging. That is, the base station may use a PEI to indicate a multicast paging message for a group of UEs (e.g., a group of UEs that is subscribed to a multicast service). However, using PEIs to indicate multicast paging messages may result in relatively high signaling overhead at the base station. Specifically, because some PEIs may be configured with a maximum number of paging sub-groups, the base station may be unable to notify the entire group of UEs with a single PEI. As such, the base station may transmit multiple PEIs to the group of UEs, which may be relatively inefficient.

In accordance with aspects of the present disclosure, the base station may indicate multicast paging messages with greater efficiency and lower signaling overhead based on transmitting a multicast PEI to a group of UEs that is scheduled to receive a multicast paging message in a subsequent PO. As described herein, the multicast PEI may be an example of a physical downlink control channel (PDCCH)-based PEI or a sequence-based PEI. In some examples, the base station may transmit control signaling that indicates one or more parameters pertaining to reception of multicast PEIs, and may transmit the multicast PEI to the group of UEs in accordance with the control signaling. The group of UEs may decode the multicast PEI based on the control signaling and may monitor the subsequent PO for the multicast paging message from the base station based on decoding the multicast PEI.

In some examples, a UE may determine that a PEI pertains to multicast paging based on one or more bits or entries in the PEI. In other examples, the UE may determine that a PEI is a multicast PEI based on using a dedicated radio network temporary identifier (RNTI) to decode the PEI. Alternatively, the UE may determine that a PEI is a multicast PEI based on a frequency range, a monitoring occasion (MO), or a symbol range in which the UE receives the PEI. In some examples, a multicast PEI may include a multicast portion (e.g., an indication of a multicast paging message) and a unicast portion (e.g., an indication of a unicast paging message).

Aspects of the present disclosure may be implemented to realize one or more of the following advantages. The described techniques may provide for improved multicast paging operations between a base station and a group of UEs. For example, the described techniques may enable a base station to indicate a multicast paging message with improved efficiency and lower signaling overhead based on transmitting a multicast PEI to a group of UEs that is scheduled to receive the multicast paging message. The multicast PEI may also enable UEs to perform multicast paging operations with greater power efficiency. For example, a UE may experience greater power savings based on receiving a multicast PEI, identifying that the UE is not scheduled to receive any multicast paging messages, and entering a low-power state (e.g., a sleep mode).

Aspects of the disclosure are initially described in the context of wireless communications systems, communication schemes, resource mapping schemes, resource diagrams, and process flows. Aspects of the disclosure are further illustrated by and described with reference to apparatus diagrams, system diagrams, and flowcharts that relate to PEI for multicast group notification.

FIG. 1 illustrates an example of a wireless communications system 100 that supports PEI for multicast group notification in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, inactive (e.g., RRC_INACTIVE) or idle (e.g., RRC_IDLE) UEs 115 may receive paging messages from a base station 105 in a PO. To enable these UEs 115 to monitor for paging messages with greater power efficiency, the base station 105 may transmit a PEI to the UEs 115 prior to the PO. The PEI may indicate whether a specific UE 115 is paged in the PO. If sub-groups are configured for the PEI, the PEI may indicate whether a specific sub-group is paged. In some examples, the PEI may support up to 8 different sub-groups per PO. Alternatively, if sub-groups are not configured for the PEI, the PEI may indicate whether any UEs 115 are scheduled to receive a paging message in the PO.

UEs 115 supporting PEI reception may experience greater power savings based on performing fewer physical downlink shared channel (PDSCH) decoding operations. For example, if a UE 115 is not scheduled to receive a paging message in a PO, the UE 115 may refrain from decoding a PDSCH component of a paging message in the PO. The UE 115 may also refrain from processing one or more synchronization signal blocks (SSB) associated with PDSCH decoding operations in the PO (e.g., SSBs used for tracking loop accuracy), which may further reduce power consumption at the UE 115. In addition, PEI decoding may be more power efficient than PDCCH decoding (e.g., decoding a PDCCH component of a paging message in the PO).

In some cases, the base station 105 may transmit a PDCCH-based PEI to the UE 115. A PDCCH-based PEI may include a number of information bits (e.g., a PDCCH payload) and one bit (e.g., a downlink control information (DCI) payload) indicating a paging sub-group. In other cases, the base station 105 may transmit a sequence-based PEI to the UE 115. A sequence-based PEI may be based on a secondary synchronization signal (SSS), a tracking reference signal (TRS), or a channel state information reference signal (CSI-RS), among other examples. In some cases, the UE 115 may use a paging RNTI (P-RNTI) to determine whether a received message is a paging message. Specifically, a UE 115 can determine that a message received from the base station 105 is a paging message based on using the P-RNTI to validate a cyclic redundancy check (CRC) of the message.

In addition to supporting paging operations for UEs in idle or inactive states, some wireless communications systems may support broadcast services for UEs in idle states, inactive states, or connected states (e.g., RRC CONNECTED). To support broadcast services, a common frequency range (CFR) may be defined for group-common PDCCH or PDSCH broadcast services. In some examples, a UE 115 may select an initial BWP as a default CFR for the group-common PDCCH or PDSCH if a specific CFR is not configured for the broadcast. In some examples, the CFR (e.g., if configured) and the initial BWP may be related.

Some wireless communications systems may also support multicast services for UEs 115 in connected states. Similar to broadcast services, a multicast CFR may be configured for group-common PDCCH or PDSCH transmissions. The multicast CFR may within a frequency resource of a dedicated unicast BWP such that a UE 115 may refrain from performing a BWP switching operation between unicast reception and multicast reception. In some cases, the multicast CFR may be configured with the same numerology (e.g., SCS, CP) as the unicast BWP.

Although UEs 115 in an idle or inactive state may be unable to receive multicast services, some wireless communications systems may support multicast paging for idle or inactive UEs 115. For example, some wireless communications systems may support group notifications (e.g., paging notifications) for UEs 115 subscribed to multicast or broadcast services (MBS). In some examples, these group notifications may indicate a group notification identity corresponding to multiple connectivity states (e.g., RRC_IDLE, RRC_INACTIVE). In some examples, a base station 105 may use a paging control channel (PCCH) to transmit a multicast activation notification (e.g., to UEs 115 subscribed to an MBS). The multicast activation notification may indicate a scheduled multicast transmission. In some examples, the multicast activation notification may indicate an MBS session identifier (e.g., for network nodes supporting MBS).

Figure 2:
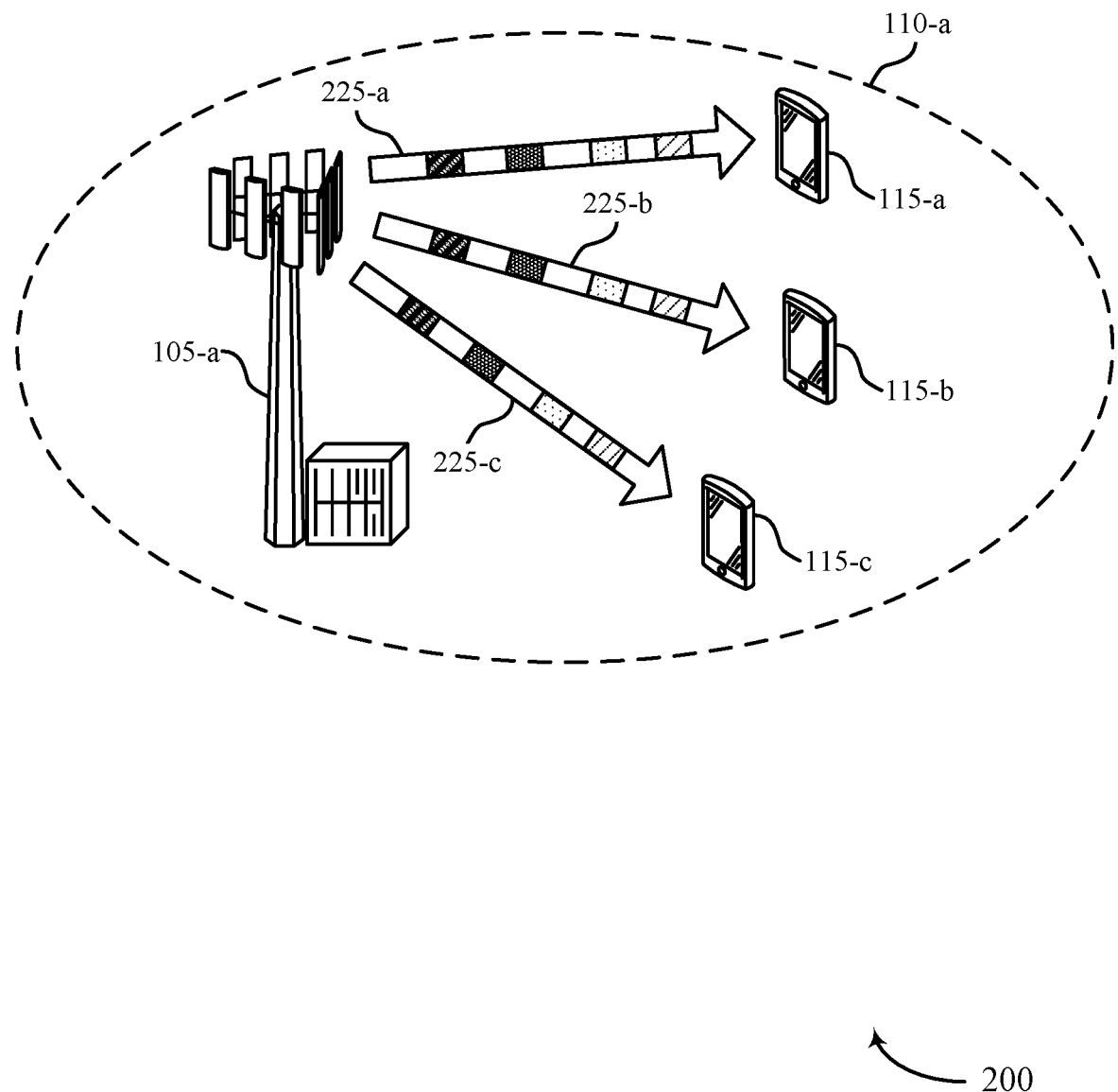
FIG. 2 illustrates an example of a wireless communications system that supports PEI for multicast group notification in accordance with aspects of the present disclosure.

FIG. 2 illustrates an example of a wireless communications system 200 that supports PEI for multicast group notification in accordance with aspects of the present disclosure. The wireless communications system 200 may implement or may be implemented by aspects of the wireless communications system 100. For example, the wireless communications system 200 may include a base station 105-*a*, a UE 115-*a*, a UE 115-*b*, and a UE 115-*c*, which may be examples of corresponding devices described with reference to FIG. 1. The base station 105-*a* and the UEs 115 may communicate within a geographic coverage area 110-*a*, which may be an example of a geographic coverage area 110 described with reference to FIG. 1. In the wireless communications system 200, the base station 105-*a* may transmit a PEI 210 to the UEs 115 over communication links 225. The PEI 210 may indicate that one or more of the UEs 115 are scheduled to receive a multicast paging message 215 in an upcoming PO.

The base station 105-*a* may transmit, to the UEs 115, control signaling 205 that indicates one or more parameters pertaining to PEI reception. In some examples, the base station 105-*a* may transmit the control signaling 205 to the UE 115-*a* over a communication link 225-*a*, may transmit the control signaling 205 to the UE 115-*b* over a communication link 225-*b*, and may transmit the control signaling 205 to the UE 115-*c* over a communication link 225-*c*. In some examples, the control signaling 205 may include a system information block (SIB), a multicast control channel (MCCH) transmission, or both. Additionally or alternatively, the control signaling 205 may include an indication to enable or disable PEIs for multicast paging messages.

The base station 105-*a* may transmit a PEI 210 to the UEs 115 in accordance with the control signaling 205. The PEI 210 may indicate a multicast paging message 215, a unicast paging message (e.g., a UE-specific paging message for one of the UEs 115), or both. Specifically, the PEI 210 may include one or more bits that indicate the multicast paging message 215, one or more bits that indicate the unicast paging message, or both. Alternatively, the PEI 210 may include one or more entries that indicate the multicast paging message 215, one or more entries that indicate the unicast paging message, or both. In some examples, the base station 105-*a* may use a dedicated RNTI to encode the PEI 210 prior to transmission. Additionally or alternatively, the base station 105-*a* may transmit the PEI 210 in a CORESET of a broadcast CFR. Specifically, one or more of the UEs 115 may receive broadcast transmissions in the broadcast CFR and may receive the PEI 210 (or multicast paging messages indicated by the PEI 210) in an initial BWP within the broadcast CFR. In some examples, the base station 105-*a* may transmit the PEI 210 in a MO that is specific to the multicast paging message 215. In other examples, the base station 105-*a* may transmit the PEI 210 in one or more symbols of a common MO (e.g., a MO used for unicast paging and multicast paging) corresponding to the multicast paging message 215.

In some examples, the base station 105-*a* may also transmit a unicast PEI to one of the UEs 115 (e.g., separate from the PEI 210). For example, the base station 105-*a* may transmit a unicast PEI to the UE 115-*b* over the communication link 225-*b*. In such examples, the base station 105-*a* may transmit the unicast PEI and the PEI 210 (e.g., a multicast PEI) in different frequency ranges. Alternatively, the base station 105-*a* may transmit the unicast PEI and the PEI 210 in different MOs. In other examples, the base station 105-*a* may transmit the unicast PEI and the PEI 210 in different symbols within the same MO.

The UEs 115 may receive the PEI 210 and may determine, based on the control signaling, that at least a portion of the PEI 210 pertains to multicast paging. In some examples, the UEs 115 may determine that the PEI 210 pertains to multicast paging based on a frequency range, a MO, or a symbol range in which the UEs 115 receive the PEI 210. In other examples, the UEs 115 may determine that the PEI 210 pertains to multicast paging based on using a dedicated multicast RNTI to decode the PEI 210 or based on detecting a PEI sequence (e.g., including the PEI 210) that corresponds to multicast paging.

The UEs 115 may determine whether to monitor for a multicast paging message 215 in a subsequent PO based on receiving the PEI 210. For example, if the UE 115-*a* and the UE 115-*c* are in a first paging group associated with a first multicast service and the PEI 210 indicates a multicast paging message 215 for the first paging group, the UE 115-*a* and the UE 115-*c* may determine to monitor for the multicast paging message 215 in a subsequent PO. In contrast, the UE 115-*b* may determine not to monitor for the multicast paging message 215 (e.g., because the UE 115-*b* is not in the first paging group). In such examples, the UE 115-*b* may enter sleep mode during the subsequent PO, which may result in reduced power consumption at the UE 115-*b*. In some examples, the multicast paging message 215 may include a PDCCH portion (e.g., a control portion) and a PDSCH portion (e.g., a data portion). The PDSCH portion of the multicast paging message 215 may indicate a multicast activation notification (e.g., a multicast group notification). Additionally or alternatively, the multicast paging message 215 may indicate a multicast transmission 220. Accordingly, one or more of the UEs 115 may monitor for the multicast transmission 220 based on receiving the multicast paging message 215 from the base station 105-*a*.

Using the PEI 210 to indicate the multicast paging message 215 may enable the base station 105-*a* to perform multicast paging operations with greater efficiency and lower signaling overhead. For example, transmitting the PEI 210 (e.g., a multicast PEI) to the UEs 115 may be more efficient than transmitting a unicast PEI to each of the UEs 115. In addition, receiving the PEI 210 in accordance with the described techniques may enable the UEs 115 to perform multicast paging operations with reduced power consumption. For example, if the UE 115-*a* receives the PEI 210 from the base station 105-*a* and determines that the UE 115-*a* is not scheduled to receive any multicast paging messages in a subsequent PO, the UE 115-*a* may refrain from performing PDCCH decoding and PDSCH decoding operations in subsequent PO, which may result in greater power savings at the UE 115-*a*.

Figure 3:
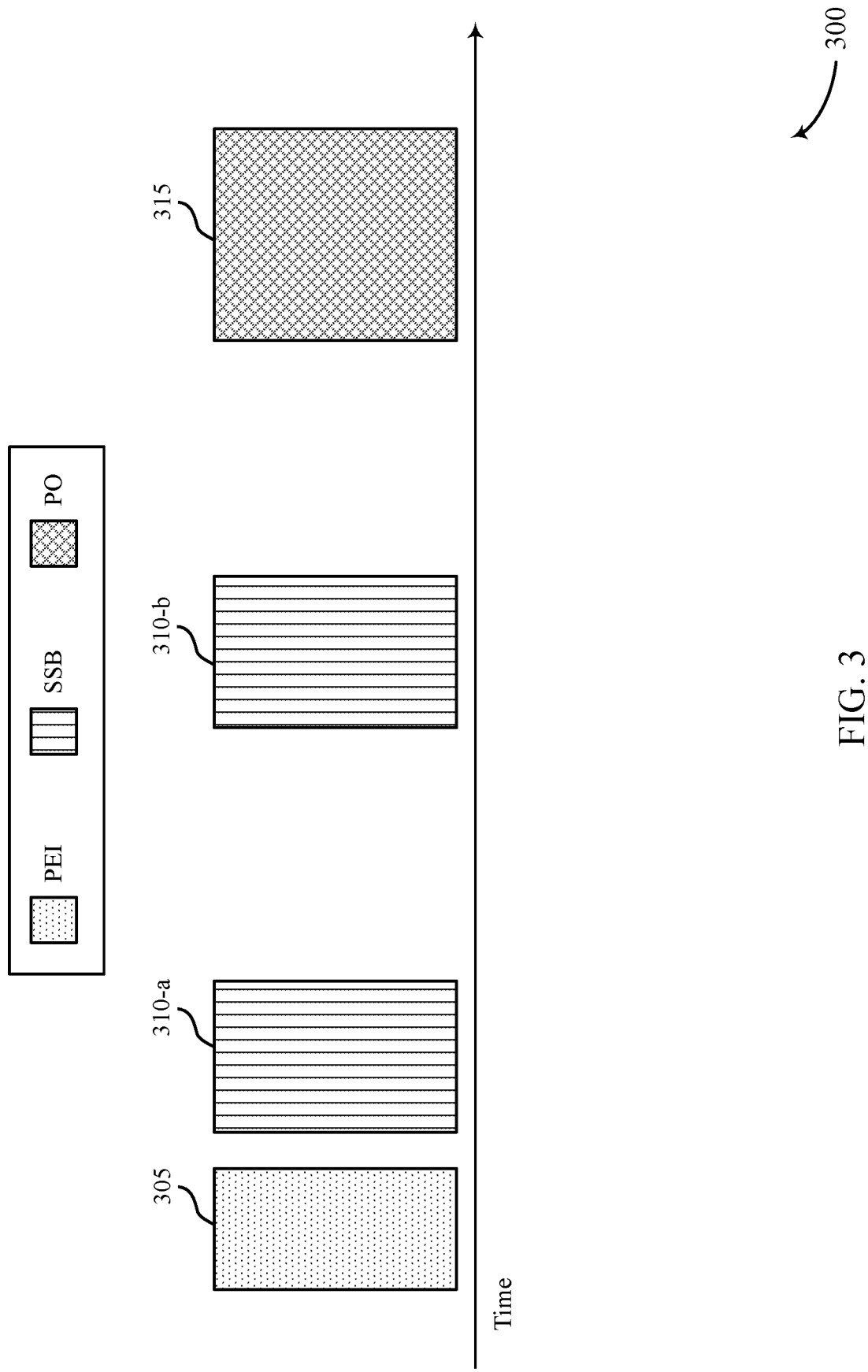
FIG. 3 illustrates an example of a communication scheme that supports PEI for multicast group notification in accordance with aspects of the present disclosure.

FIG. 3 illustrates an example of a communication scheme 300 that supports PEI for multicast group notification in accordance with aspects of the present disclosure. The communication scheme 300 may implement or be implemented by aspects of the wireless communications system 100 or the wireless communication system 200. For example, the communication scheme 300 may be implemented by a UE 115 or a base station 105, which may be examples of corresponding devices described with reference to FIGS. 1 and 2. In the communication scheme 300, a UE 115 may determine whether to process one or more SSBs 310 or decode one or more paging messages in a PO 315 based on receiving a PEI 305.

As described with reference to FIGS. 1 and 2, a base station 105 may transmit a PEI 305 to indicate one or more paging messages scheduled in a PO 315. A UE 115 may determine, based on the PEI 305, whether the UE 115 is scheduled to receive any paging messages from the base station 105 in the PO 315. Specifically, the PEI 305 may indicate one or more paging sub-groups that are scheduled to receive paging messages in the PO 315. If a sub-group of the UE 115 is scheduled to receive a paging message from the base station 105, the UE 115 may remain in an active state to monitor for paging messages during the PO 315. In some cases, the UE 115 may receive and measure an SSB 310-a and an SSB 310-b prior to the PO 315 (e.g., to ensure tracking loop accuracy at the UE 115), and may decode the paging message based on measuring the SSBs 310. Alternatively, if the UE 115 determines that the UE 115 is not scheduled to receive a paging message (e.g., if a sub-group of the UE 115 is not paged), the UE 115 may enter a sleep mode during the PO 315 to conserve power.

In some examples, the PEI 305 may be a PDCCH-based PEI. In other examples, the PEI 305 may be a SSS-based PEI, a TRS-based PEI, or a CSI-RS-based PEI, among other examples. For paging indications to sub-groups in the PO 315 when using PDCCH-based PEI, sub-groups in the PO 315 may be indicated by the PEI 305. The PEI 305 may have a one bit DCI payload indicating one sub-group. In some cases, a code-point based mapping may be used to map the sub-groups to the PO 315.

For SSS-based PEI, sub-groups in the PO 315 may be indicated by a set of sequences. In some cases, sequence mapping may support up to 8 sub-groups per PO. Physical-layer configuration and sequence generation for the PEI 305 may depend on initial access and radio resource management (RRM) measurements performed by the UE 115. For TRS-based PEIs or CSI-RS-based PEIs, sub-groups in the PO 315 may be indicated by a TRS sequence with an orthogonal cover. That is, one orthogonal cover of the PEI may indicate one sub-group or combination of sub-groups. In some examples, the orthogonal cover may include a set of TRS sequences indicating sub-groups with one selected sequence transmitted in one TRS resource.

In some examples, sequence mapping may support up to 8 subgroups per PO or a combination of sub-groups. In some examples, multiple TRS or CSI-RS resources may be multiplexed in an FDM manner, a TDM manner, or a code-division multiplexing (CDM) manner within the same MO, where one TRS or CSI-RS resource indicates one sub-group. In some cases, CSI-RS FDM, TDM, or CDM patterns may be implemented to support up to 8 sub-groups in the PO 315.

In some examples, physical-layer configurations for the PEI 305 may include the same idle-mode reception bandwidth as a specific CORESET (e.g., CORESET-0) frequency span. In some examples (e.g., for PDCCH-based PEI), the PEI 305 can be transmitted on resources within a PDCCH CORESET at a granularity of one or more PDCCH candidates. A specific number of multiplexed PDCCH candidates in the PDCCH CORESET may be based on a parameter pertaining to PDCCH-based PEI and a relative size of a PDCCH CORESET.

In some cases, the specific number of multiplexed PDCCH candidates may depend on a CSI-RS mapping pattern or a relative size and location of a PDCCH CORESET. For some PDCCH-based PEI implementations as well as for TRS, CSI-RS or SSS-based PEI implementations, the PEI 305 may indicate whether the UE 115 is to monitor the PO 315 (e.g., whether a sub-group of the UE 115 is paged). In some cases, the UE 115 may refrain from monitoring the PO 315 if the UE 115 does not detect the PEI 305 at all PEI occasions for the PO 315. Additionally or alternatively, the UE 115 may refrain from processing the SSB 310-a, the SSB 310-b, or both if the UE 115 does not detect the PEI 305 at all PEI occasions for the PO 315. In other examples, the UE 115 may monitor the PO 315 even if the UE 115 does not detect the PEI 305 at all PEI occasions for the PO 315.

FIGS. 4A, 4B, 4C, 4D, and 4E illustrate examples of resource mapping schemes 400, 401, 402, 403, and 404, respectively, that support PEI for multicast group notification in accordance with aspects of the present disclosure. The resource mapping schemes 400, 401, 402, 403, and 404 may implement or be implemented by aspects of the wireless communications system 100 or the wireless communications system 200. For example, the resource mapping schemes 400, 401, 402, 403, and 404 may be implemented by a UE 115 or a base station 105, which may be examples of corresponding devices described with reference to FIGS. 1 and 2.

Figure 4A:
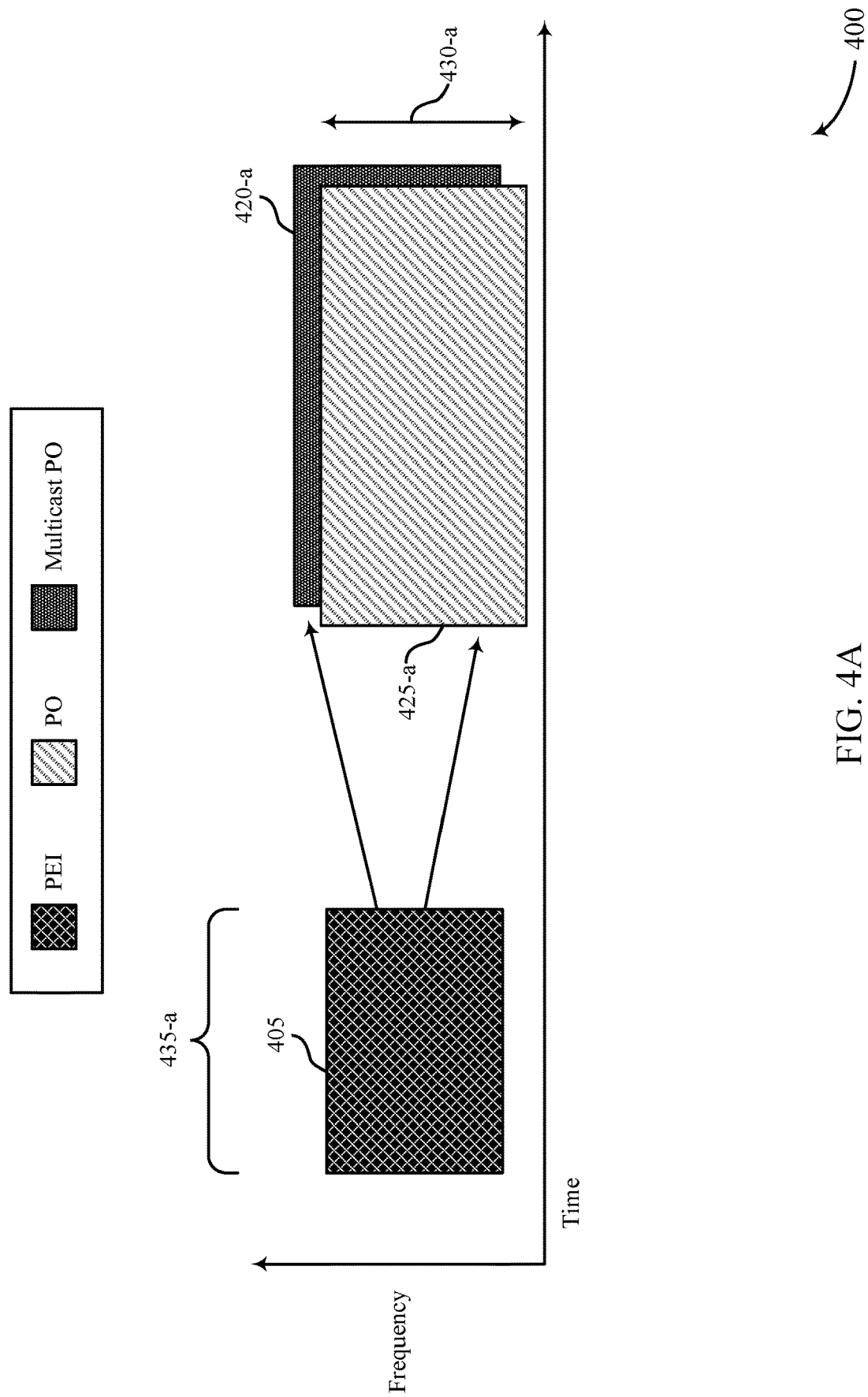
FIGS. 4A, 4B, 4C, 4D, and 4E illustrate examples of resource mapping schemes that support PEI for multicast group notification in accordance with aspects of the present disclosure.

In the example of FIG. 4A, a base station 105 may transmit a PEI 405 to a group of UEs 115 during a MO 435-a. The PEI 405 may include a number of payload bits or number of entries for unicast (e.g., UE-specific) paging and a number of payload bits or entries for multicast paging. In some examples, the multicast payload bits or entries may be separate from the unicast payload bits or entries. The number of payload bits or entries corresponding to unicast paging and the number of payload bits or entries corresponding to multicast paging can be fixed or configured by a SIB. In some examples, the SIB (or an MCCH transmission) may configure different numbers of payload bits or entries for MCCH transmissions and multicast traffic channel (MTCH) transmissions. For example, a number of multicast payload bits in an MCCH transmission may be different from a number of multicast payload bits in an MTCH transmission. As an example, if the PEI 405 includes a 12-bit payload, the PEI may include a first number of bits (e.g., X bits) for multicast paging and a second number of bits (e.g., 3 bits) for UE-specific paging. The second number of bits may be used to indicate a number of unicast sub-groups (e.g., 8 sub-groups). In some cases, remaining bits in the PEI 405 may be fixed or predefined. In other examples, if the PEI 405 includes a 12-bit payload, the PEI may include a number of entries for UE-specific paging, a number of entries for multicast paging, a number of entries for joint paging (e.g., UE-specific paging and multicast paging), or a combination thereof. Any remaining entries in the PEI 405 may be fixed or predefined.

In some cases, the PEI 405 may indicate a sub-group of UEs 115 that is scheduled to receive a multicast paging message in a multicast PO 420-a. Additionally or alternatively, the PEI 405 may indicate a specific UE 115 (or sub-group of UEs 115) that is scheduled to receive a unicast paging message in a PO 425-a. In some examples, a UE 115 may monitor the multicast PO 420-a and the PO 425-a using similar criteria (e.g., time resources, frequency resources, monitoring configurations). If the PEI 405 indicates a specific sub-group, UEs 115 in the sub-group may monitor a CORESET 430-a for a PDCCH transmission scheduling the unicast paging message. To support joint PEI signaling, UEs 115 supporting multicast services and UEs 115 not supporting multicast services may be in different sub-groups. In some examples, a UE 115 supporting multicast services may be assigned to a first sub-group that shares a PEI for multicast paging and a second sub-group that shares a PEI for unicast paging. Additionally or alternatively, a UE 115 supporting multicast services may be assigned to a sub-group that shares a PEI for both multicast paging and unicast paging. The PEI 405 may be a PDCCH-based PEI or a sequence-based PEI, as described with reference to FIG. 3.

In some examples, the PEI 405 may include a configured PEI sequence that jointly indicates unicast paging and multicast paging. For example, a number of possible PEI sequences may be fixed or configured by a SIB or an MCCH transmission, and the PEI 405 may indicate one of the possible PEI sequences. In some examples, MCCH transmissions and MTCH transmissions may be configured with the same number of possible PEI sequences. In other examples, MCCH transmissions may be configured (e.g., via a SIB) with a first number of possible PEI sequences and MTCH transmissions may be configured (e.g., via an MCCH transmission) with a second number of possible PEI sequences. In some examples, UEs 115 supporting multicast services may be grouped together and may share a PEI sequence for multicast paging and unicast paging. In other examples, additional PEI sequences can be configured for multicast paging. These additional PEI sequences can be fixed or configured by a SIB or an MCCH transmission, and may be differentiated by scrambling sequences or a cyclic shifts, among other examples.

Figure 4B:
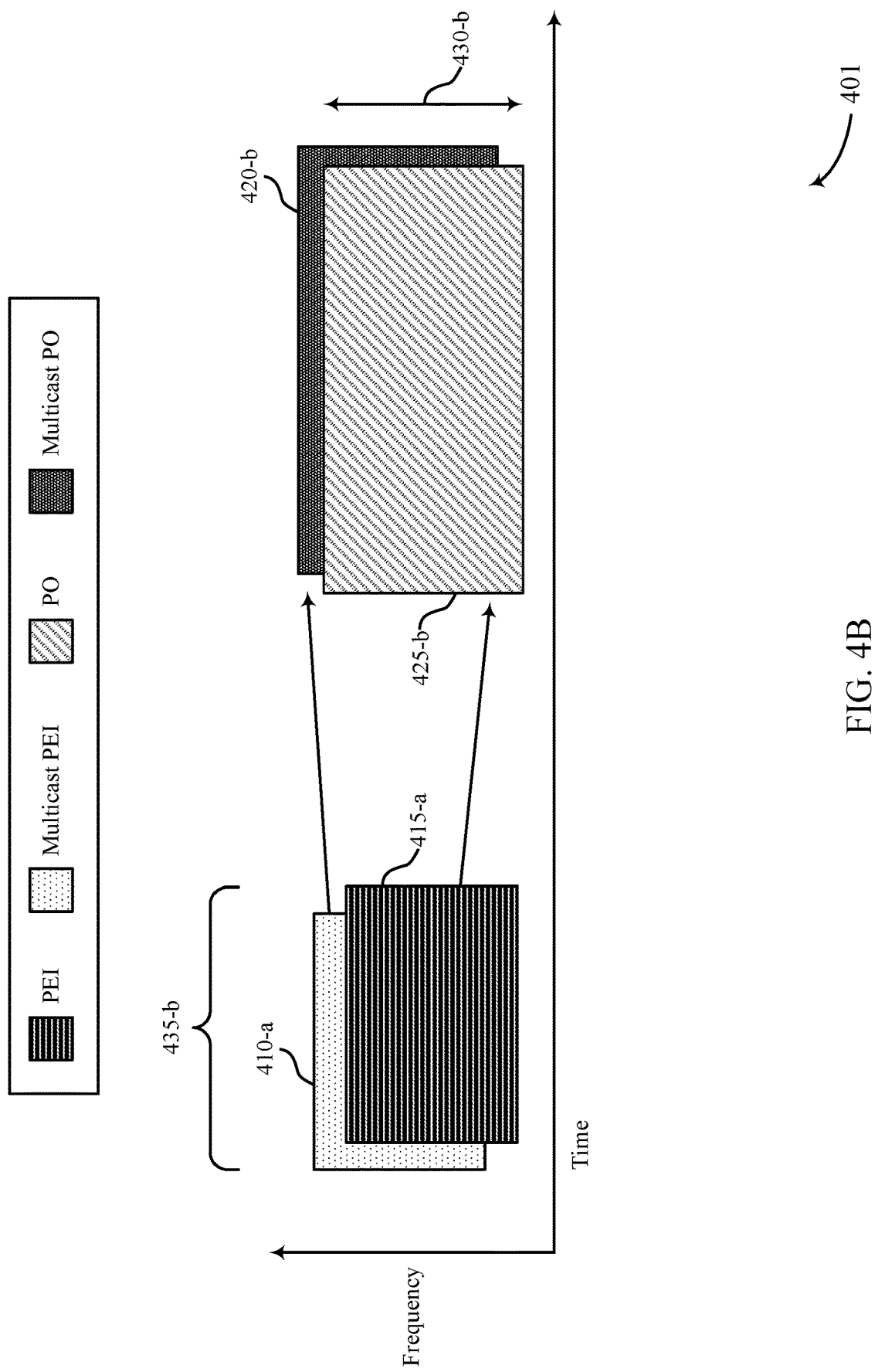

In the example of FIG. 4B, a base station 105 may transmit a multicast PEI 410-a and a PEI 415-a in a MO 435-b using CDM techniques (e.g., using the same time and frequency resources). For example, the base station 105 may use different RNTIs to encode the multicast PEI 410-a and the PEI 415-a. Specifically, the base station 105 may use a dedicated RNTI to scramble a CRC of the multicast PEI 410-a. The multicast PEI 410-a, the PEI 415-a, or both may be examples of a PDCCH-based PEI or a sequence-based PEI, as described with reference to FIG. 3. If, for example, the multicast PEI 410-a is a PDCCH-based PEI, one or more payload bits in the multicast PEI 410-a can be used to indicate one or more multicast paging groups. Alternatively, if the multicast PEI 410-a is a sequence-based PEI, the multicast PEI 410-a may include a preconfigured sequence of reference signals or synchronization signals that indicates a multicast paging message.

The multicast PEI 410-a may indicate one or more sub-groups scheduled to receive multicast paging messages in a multicast PO 420-b. Likewise, the PEI 415-a may indicate one or more sub-groups scheduled to receive unicast paging messages in a PO 425-b. In some examples, a UE 115 may monitor a CORESET 430-b for a PDCCH transmission indicating a unicast paging message based on receiving the PEI 415-a. Similarly, a UE 115 (or a group of UEs 115) may monitor the CORESET 430-b for a PDCCH transmission indicating a multicast paging message based on receiving the multicast PEI 410-a.

Figure 4C:
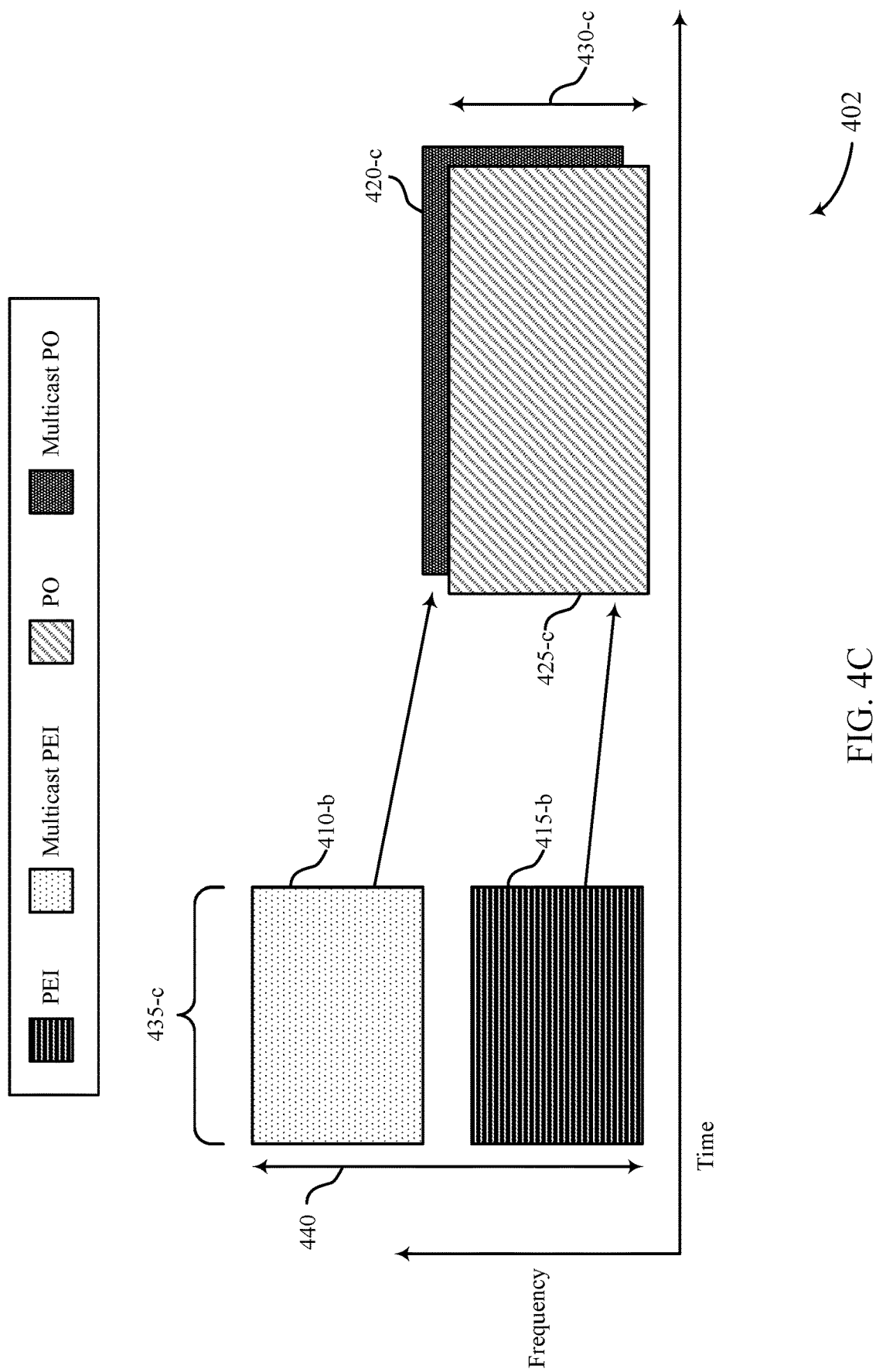

In the example of FIG. 4C, a base station 105 may transmit a multicast PEI 410-b and a PEI 415-b in a MO 435-c using FDM techniques. That is, the base station 105 may transmit the multicast PEI 410-b and the PEI 415-b in different frequency ranges (e.g., within the same MO). For example, the base station may transmit the PEI 415-b in a first CORESET (e.g., CORESET #0, otherwise known as an initial BWP) associated with unicast paging and may transmit the multicast PEI 410-b in second CORESET configured for a broadcast CFR 440, which may have a larger frequency bandwidth than the first CORESET. In some examples, the first CORESET may overlap with the second CORESET (e.g., the first CORESET may be FDMed with the second CORESET). In such examples, if the UE 115 detects a PEI within the first CORESET, the UE 115 may determine that the PEI is a unicast PEI. Alternatively, if the UE 115 detects the PEI within the second CORESET but not within the first CORESET, the UE 115 may determine that the PEI is for multicast paging.

In some examples, the multicast PEI 410-b may be an example of a PDCCH-based PEI or a sequence-based PEI as described with reference to FIG. 3. The multicast PEI 410-b may indicate one or more multicast paging messages scheduled in a multicast PO 420-c. Likewise, the PEI 415-b may indicate one or more UE-specific paging messages scheduled in a PO 425-c. In some examples, a UE 115 may monitor a CORESET 430-c for a unicast paging message based on receiving the PEI 415-b. Similarly, a group of UEs 115 may monitor the CORESET 430-c (or a different CORESET configured for the multicast PO 420-c) based on receiving the multicast PEI 410-b.

Figure 4D:
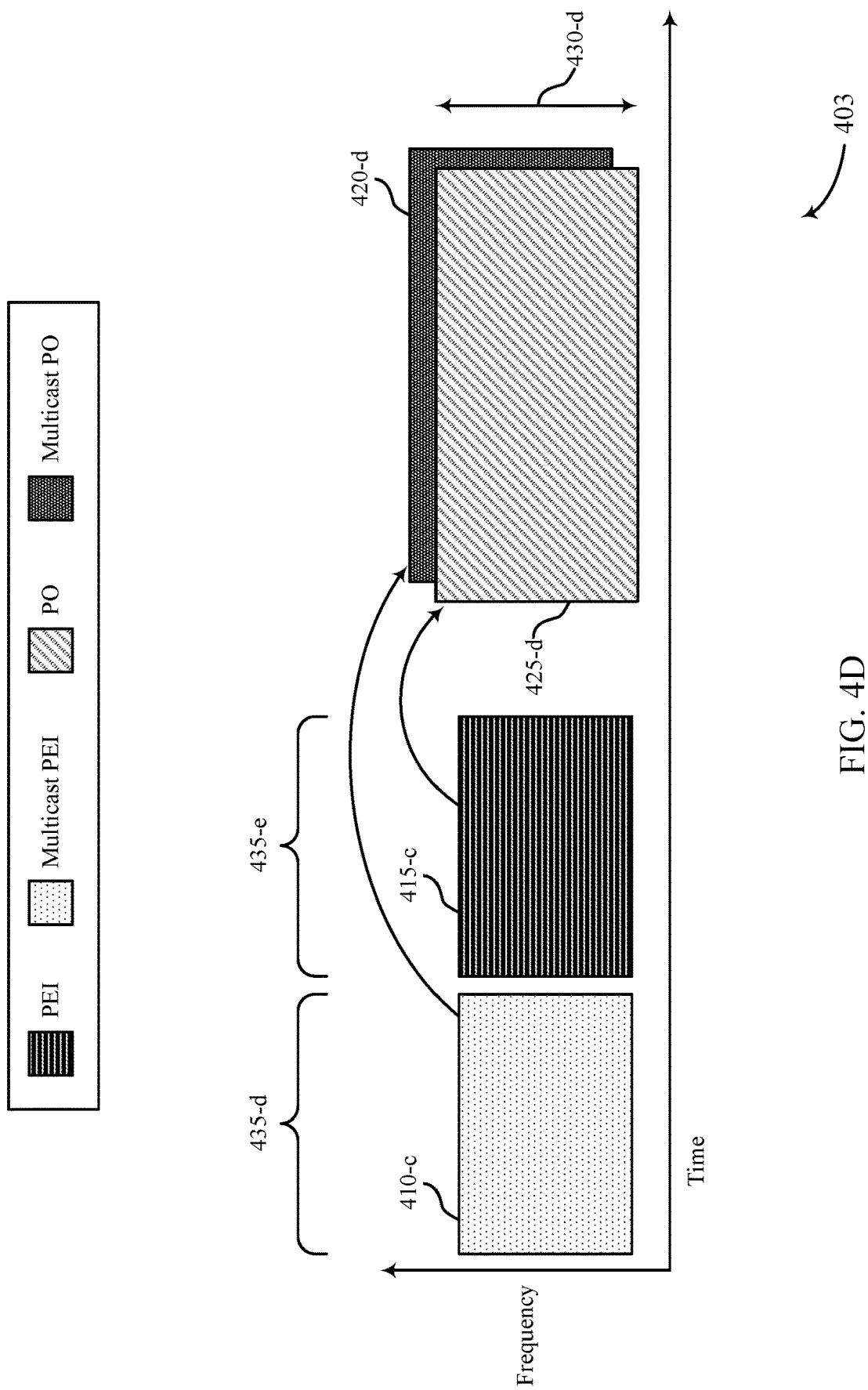

In the example of FIG. 4D, a base station 105 may transmit a multicast PEI 410-c and a PEI 415-c in different MOs 435 using TDM techniques. For example, the base station 105 may transmit the PEI 415-c in a MO 435-e, and may transmit the multicast PEI 410-c in a MO 435-d. The PEI 415-c may indicate one or more sub-groups that are scheduled to receive unicast paging messages in a PO 425-d. Likewise, the multicast PEI 410-c may indicate one or more sub-groups that are scheduled to receive multicast paging messages in a multicast PO 420-d. In some examples, the PO 425-d and the multicast PO 420-d may overlap in the time domain, the frequency domain, or both.

A UE 115 may receive the PEI 415-c and monitor a CORESET 430-d for a unicast paging message in accordance with the PEI 415-c. For example, if the PEI 415-c indicates that a sub-group of the UE 115 is paged in the PO 425-d, the UE 115 may monitor the CORESET 430-d for unicast paging messages from the base station 105. Similarly, the UE 115 may receive the multicast PEI 410-c and may monitor the CORESET 430-d (or a CORESET associated with the multicast PO 420-d) for a multicast paging message from the base station 105. For example, if the multicast PEI 410-c indicates that a sub-group of the UE 115 is scheduled to receive a multicast paging message in the multicast PO 420-d, the UE 115 may monitor for the multicast paging message in accordance with the multicast PEI 410-c.

Figure 4E:
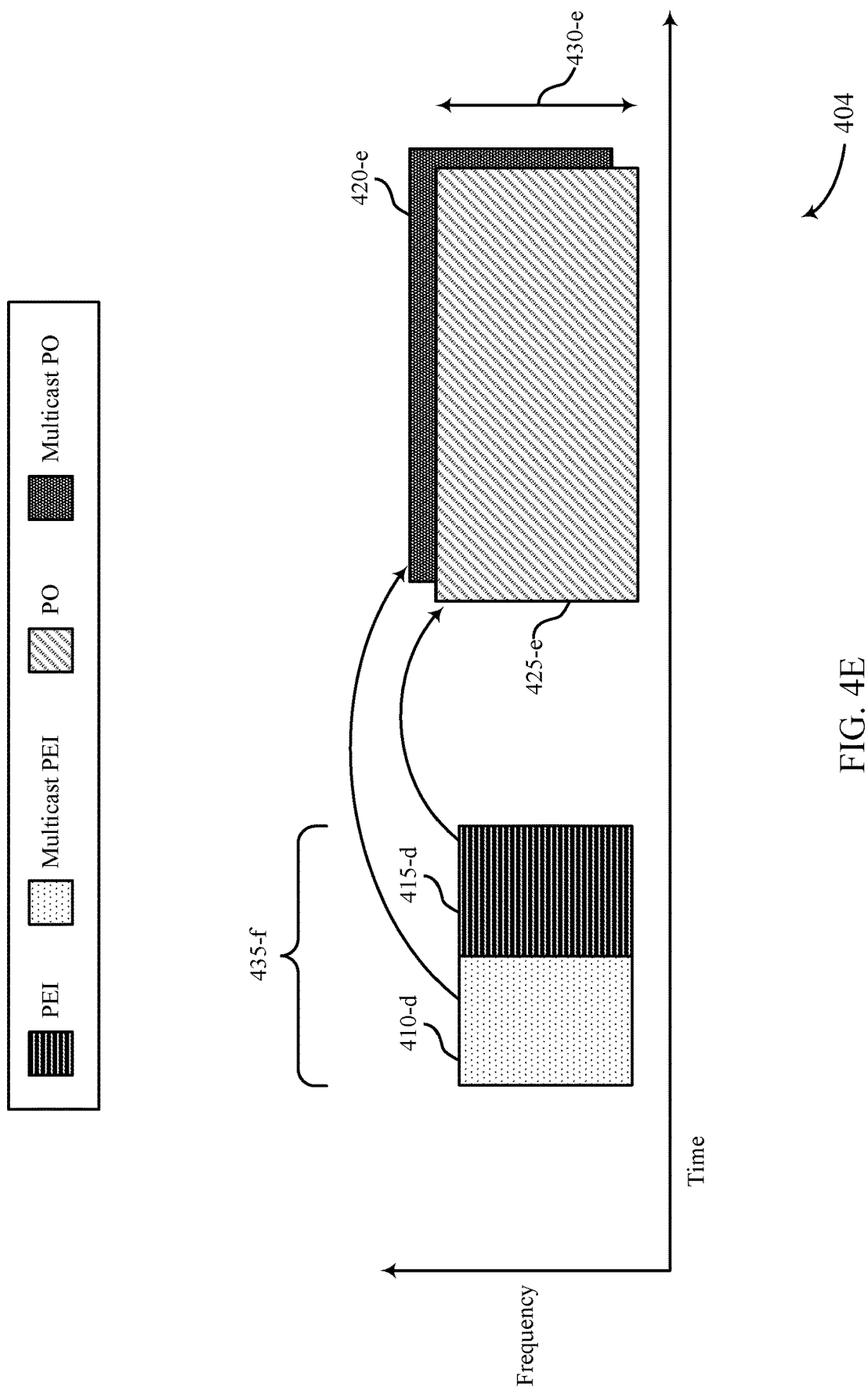

In the example of FIG. 4E, a base station 105 may transmit a multicast PEI 410-d and a PEI 415-d in different symbol locations of a MO 435-f. In some examples, the multicast PEI 410-d and the PEI 415-d may be configured with different starting symbol locations or PEI sequences, as described with reference to FIG. 5. The PEI 415-d may indicate one or more unicast paging messages scheduled in a PO 425-e. A UE 115 may receive the PEI 415-d and may determine whether to monitor a CORESET 430-e for a unicast paging message from the base station 105 based on the PEI 415-d. For example, if the PEI 415-d indicates that a sub-group of the UE 115 has a paging message scheduled in the PO 425-e, the UE 115 may monitor the CORESET 430-e for the paging message. Likewise, the multicast PEI 410-d may indicate a multicast paging message scheduled in a multicast PO 420-e. A UE 115 may receive the multicast PEI 410-d and determine whether to monitor the CORESET 430-e (or a CORESET configured for the multicast PO 420-e) based on the multicast PEI 410-d. For example, if the multicast PEI 410-d indicates that a sub-group of the UE 115 is scheduled to receive a paging message for a first multicast service (e.g., to which the UE 115 is subscribed) in the multicast PO 420-e, the UE 115 may monitor the CORESET 430-e for the scheduled paging message in accordance with the multicast PEI 410-d.

Figure 5:
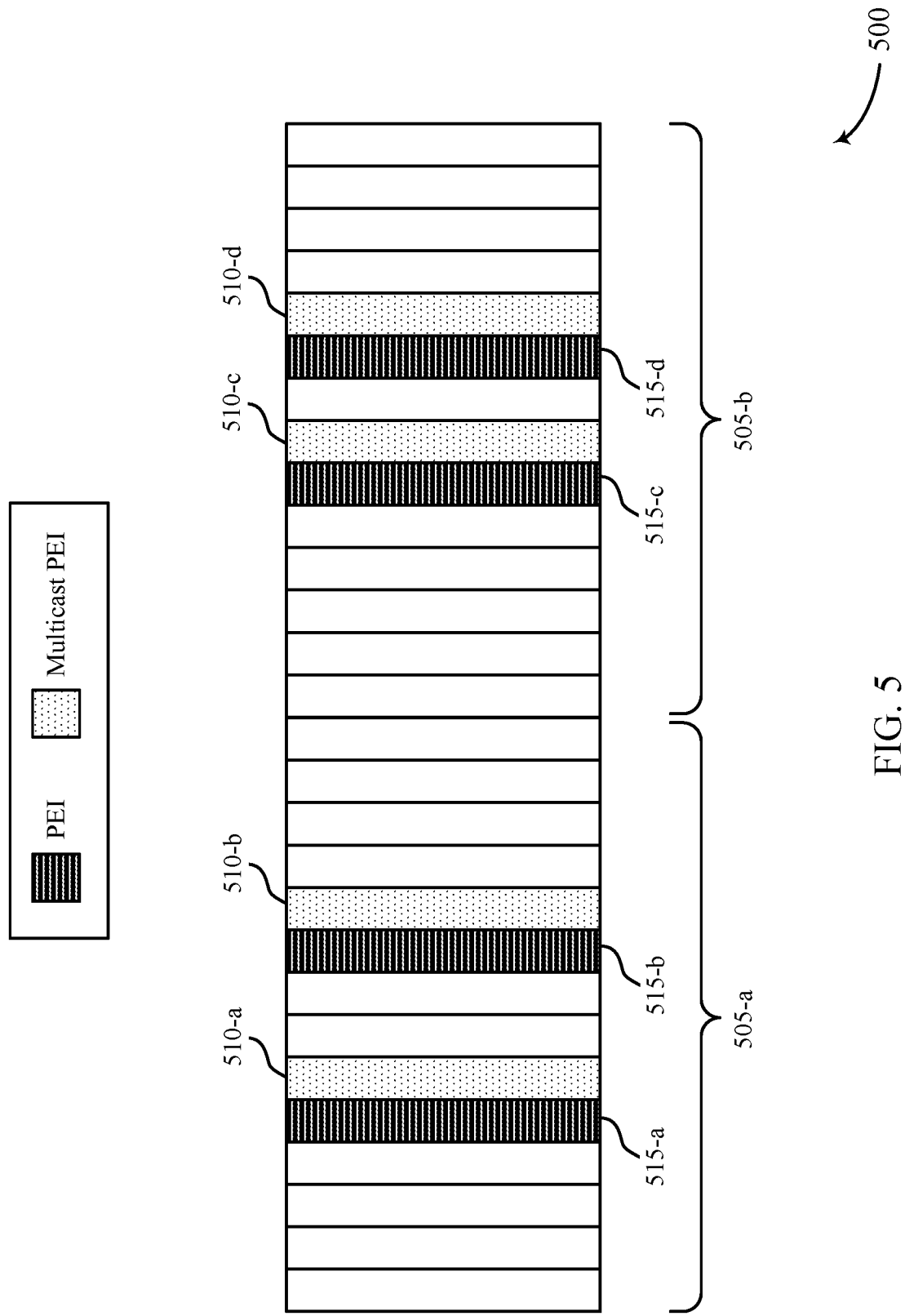
FIG. 5 illustrates an example of a resource diagram that supports PEI for multicast group notification in accordance with aspects of the present disclosure.

FIG. 5 illustrates an example of a resource diagram 500 that supports PEI for multicast group notification in accordance with aspects of the present disclosure. In some examples the resource diagram 500 may implement or be implemented by aspects of the wireless communications system 100 or the wireless communications system 200. For example, the resource diagram 500 may be implemented by a UE 115 or a base station 105, which may be examples of corresponding devices described with reference to FIGS. 1 and 2. In accordance with the resource diagram 500, a UE 115 may receive PEIs 515 (e.g., for unicast paging) and multicast PEIs 510 (e.g., for multicast paging) in different symbol locations of a slot 505-*a* and a slot 505-*b*.

As described with reference to FIGS. 1-4, a base station 105 may transmit a PEI to a UE 115 that is in an idle or inactive state. The PEI may indicate whether the UE 115 is scheduled to receive a paging message in an upcoming PO. Specifically, the PEI may indicate one or more UE subgroups that are scheduled to receive paging messages in the upcoming PO. The UE 115 may use the PEI to determine whether to monitor for paging messages in the upcoming PO. For example, if the UE 115 decodes the PEI and determines that the UE 115 is scheduled to receive a paging message in the upcoming PO, the UE may remain in an active state to monitor for the paging message. Alternatively, if the UE 115 decodes the PEI and determines that the UE 115 is not scheduled to receive any paging messages in the upcoming PO, the UE 115 may enter a sleep mode to conserve power.

The base station 105 may use PEIs to indicate paging messages for specific UEs 115. In some cases, however, the base station 105 may also use PEIs for multicast paging. That is, the base station 105 may use a PEI to indicate a multicast paging message for a group of UEs 115 (e.g., a group of UEs 115 that is subscribed to a multicast service). However, using PEIs to indicate multicast paging messages may result in relatively high signaling overhead at the base station 105. Specifically, because some PEIs may be configured with a maximum number of paging sub-groups, the base station 105 may be unable to notify the entire group of UEs 115 with a single PEI. As such, the base station 105 may transmit multiple PEIs to the group of UEs 115, which may be relatively inefficient.

In accordance with aspects of the present disclosure, the base station 105 may indicate multicast paging messages with greater efficiency and lower signaling overhead based on transmitting a multicast PEI to a group of UEs 115 that is scheduled to receive a multicast paging message in a subsequent PO. In some examples, the base station 105 may transmit control signaling that indicates one or more parameters pertaining to reception of multicast PEIs, and may transmit the multicast PEI to the group of UEs 115 in accordance with the control signaling. The group of UEs 115 may decode the multicast PEI based on the control signaling and may monitor the subsequent PO for the multicast paging message from the base station 105 based on decoding the multicast PEI.

In the example of FIG. 5, the base station 105 may transmit PEIs 515 and multicast PEIs 510 to a UE 115. The PEIs 515, the multicast PEIs 510, or both may be examples of PDCCH-based PEIs, SSS-based PEIs, TRS-based PEIs, or CSI-RS based PEIs, as described with reference to FIG. 3. In some examples, the UE 115 may determine that the multicast PEIs 510 pertain to multicast paging based on a sequence associated with the multicast PEIs 510. As an example, the UE 115 may receive a multicast PEI 510-*a* and a multicast PEI 510-*b* in a slot 505-*a*, and may receive a multicast PEI-510-*c* and a multicast PEI 510-*d* in a slot 505-*b*. The UE 115 may determine that the multicast PEIs 510 pertain to multicast paging based on a first set of symbol locations in which the UE 115 receives the multicast PEIs 510. Likewise, if the UE 115 receives a PEI 515-*a* and a PEI 515-*b* in the slot 505-*a* and the UE 115 receives a PEI 515-*c* and a PEI 515-*d* in the slot 505-*b*, the UE 115 may determine that the PEIs 515 pertain to unicast paging based on a second set of symbol locations in which the UE 115 receives the PEIs 515. In some examples, the PEIs 515 and the multicast PEIs 510 may also be configured with different starting symbol locations. Thus, the UE 115 may determine whether a PEI corresponds to unicast paging or multicast paging based on a starting symbol in which the UE receives the PEI.

Using PEIs to indicate multicast paging messages in accordance with the described techniques may enable a base station 105 to perform multicast paging operations with greater efficiency and lower signaling overhead, among other benefits. Additionally, the described techniques may enable UEs 115 to experience greater power savings based on receiving a PEI related to a multicast paging message. For example, if a UE 115 receives a PEI for multicast paging and determines that the UE 115 is not scheduled to receive any multicast paging messages in an upcoming PO, the UE 115 may refrain from decoding PDCCH and PDSCH messages in the upcoming PO, which may reduce power consumption at the UE 115.

Figure 6:
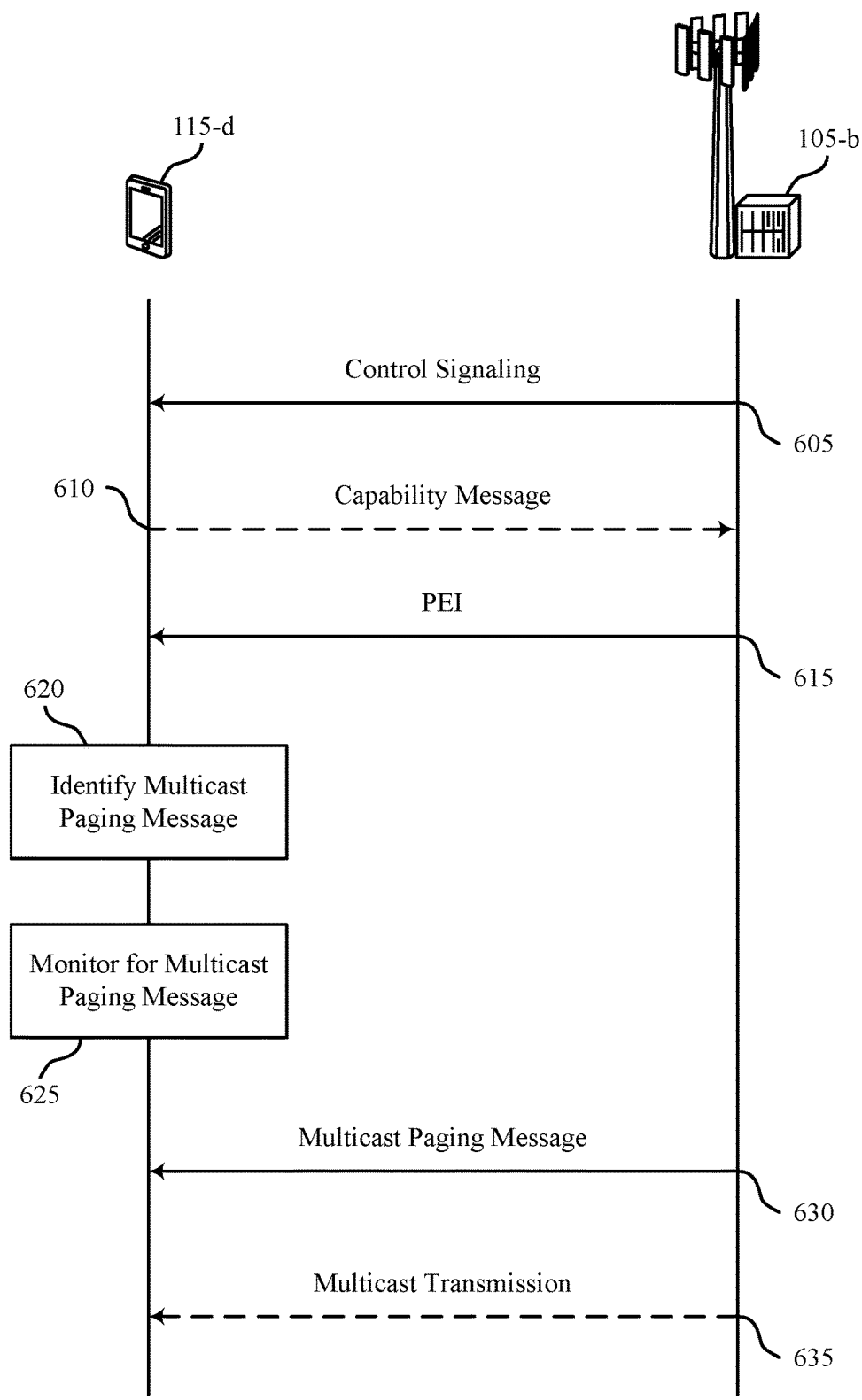
FIG. 6 illustrates an example of a process flow that supports PEI for multicast group notification in accordance with aspects of the present disclosure.

FIG. 6 illustrates an example of a process flow 600 that supports PEI for multicast group notification in accordance with aspects of the present disclosure. The process flow 600 may implement or be implemented by aspects of the wireless communications system 100 or the wireless communications system 200. For example, the process flow 600 may include a UE 115-*d* and a base station 105-*b*, which may be examples of corresponding devices described with reference to FIGS. 1 and 2. In the following description of the process flow 600, operations between the UE 115-*d* and the base station 105-*b* may be performed in a different order or at a different time than as shown. Additionally or alternatively, some operations may be omitted from the process flow 600, and other operations may be added to the process flow 600.

At 605, the base station 105-*b* may transmit control signaling to the UE 115-*d* that indicates one or more parameters pertaining to reception of PEIs at the UE 115-*d*. Specifically, the control signaling may include an SIB or an MCCH transmission that includes an indication of the one or more parameters, an indication to enable or disable PEIs for multicast paging messages, or both. In some examples, the UE 115-*d* may transmit a capability message to the base station 105-*b* at 610. The capability message may indicate a capability of the UE 115-*d* to receive PEIs for multicast paging messages.

At 615, the base station 105-*b* may transmit a PEI to the UE 115-*d* in accordance with the control signaling. In some examples, the PEI may be an example of a multicast PEI as described with reference to FIGS. 1-5. In other examples, the PEI may be an example of a joint PEI that indicates a multicast paging message, a unicast paging message, or both. The base station 105-*b* may transmit the PEI to the UE 115-*d* if, for example, the UE 115-*d* is in an idle or inactive state. In some examples, the base station 105-*b* may transmit the PEI in a CORESET of a broadcast CFR. In other examples, the base station 105-*b* may encode the PEI with a RNTI dedicated to multicast paging prior to transmitting the PEI. Additionally or alternatively, the base station 105-*b* may transmit the PEI in a MO or a symbol range that is specific to multicast paging. In some examples, the PEI may be an example of a PDCCH-based PEI or a sequence-based PEI, as described with reference to FIGS. 1-5. If, for example, the PEI is a sequence-based PEI, the base station 105-*b* may transmit one or more synchronization signals (e.g., SSS) or reference signals (e.g., TRS, CSI-RS) in a sequence that indicates the PEI.

At 620, the UE 115-*d* may determine, based on the control signaling, that at least a part of the PEI pertains to a group of UEs (e.g., including the UE 115-*d*) that are subscribed to one or more multicast services. In some examples, the UE 115-*d* may identify that one or more bits or entries in the PEI indicate a multicast paging message, and may determine that the UE 115-*d* is scheduled to receive the multicast paging message from the base station 105-*b* in a subsequent PO based on the one or more bits or entries. In other examples, the UE 115-*d* may determine that the PEI pertains to the group of UEs based on a frequency range (e.g., a CFR), a MO, or a symbol range in which the UE 115-*d* receives the PEI. Additionally or alternatively, the UE 115-*d* may determine that the PEI pertains to the group of UEs based on using a dedicated RNTI (e.g., dedicated to multicast paging) to decode the PEI.

At 625, the UE 115-*d* may monitor for a multicast paging message from the base station 105-*b* based on determining that at least a part of the PEI pertains to the group of UEs. In some examples, the UE 115-*d* may monitor for the multicast paging message in a PO that is specific to multicast paging. In other examples, the UE 115-*d* may monitor for the multicast paging message in a PO that is common to multicast paging and unicast paging. At 630, the base station 105-*b* may transmit a multicast paging message to the UE 115-*d* in accordance with the PEI. The multicast paging message may indicate information pertaining to a subsequent multicast transmission. In some examples, the base station 105-*b* may transmit a multicast transmission at 635 in accordance with the multicast paging message. In some examples, the UE 115-*d* may transition from an idle or inactive state (e.g., RRC_IDLE, RRC_INACTIVE) to a connected state (e.g., RRC CONNECTED) prior to receiving the multicast transmission from the base station 105-*b*.

Using PEIs to indicate multicast paging messages in accordance with the described techniques may enable the base station 105-*b* to perform multicast paging operations with greater efficiency and lower signaling overhead, among other benefits. Additionally, the described techniques may enable the UE 115-*d* to experience greater power savings based on receiving a PEI related to a multicast paging message. For example, if the UE 115-*d* receives a PEI for multicast paging and determines that the UE 115-*d* is not scheduled to receive any multicast paging messages in an upcoming PO, the UE 115-*d* may refrain from decoding PDCCH and PDSCH messages in the upcoming PO, which may reduce power consumption at the UE 115-*d*.

Figure 7:
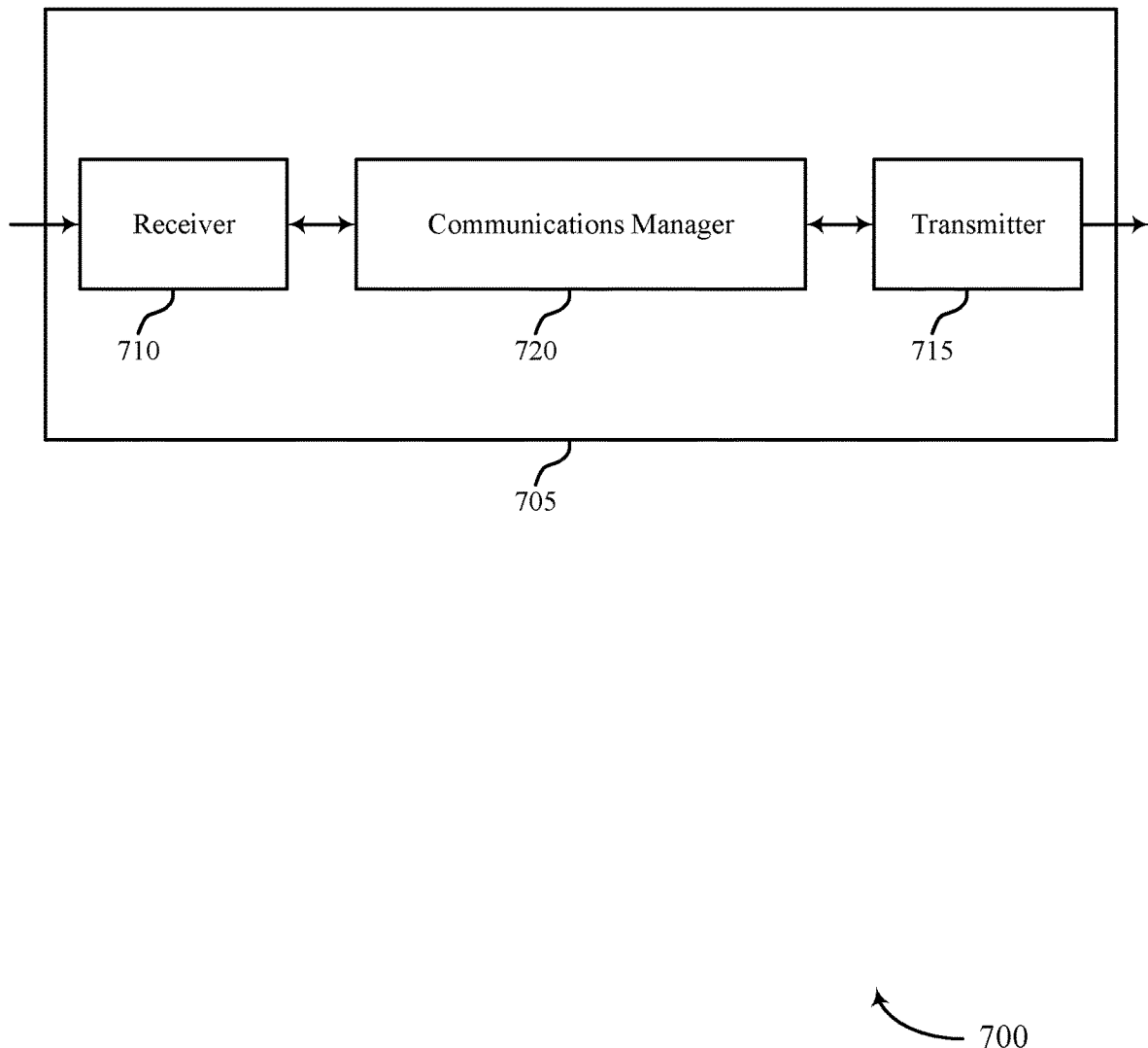
FIGS. 7 and 8 show block diagrams of devices that support PEI for multicast group notification in accordance with aspects of the present disclosure.

FIG. 7 shows a block diagram 700 of a device 705 that supports PEI for multicast group notification in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to PEI for multicast group notification). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to PEI for multicast group notification). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of PEI for multicast group notification as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at the device 705 in accordance with examples as disclosed herein. For example, the communications manager 720 may be configured as or otherwise support a means for receiving, from a base station, control signaling that indicates one or more parameters pertaining to reception of PEIs at the device 705. The communications manager 720 may be configured as or otherwise support a means for receiving a PEI from the base station in accordance with the one or more parameters. The communications manager 720 may be configured as or otherwise support a means for determining, based on the one or more parameters, that at least a part of the PEI pertains to a group of UEs that is subscribed to one or more multicast services, where the device 705 is one of the group of UEs. The communications manager 720 may be configured as or otherwise support a means for monitoring for a multicast paging message from the base station based on the PEI pertaining to the group of UEs.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced power consumption at the device 705. For example, the device 705 may receive a PEI from a base station and may determine, based on the PEI, that the device 705 is not scheduled to receive any multicast paging messages from the base station in a subsequent PO. Accordingly, the device 705 may enter a low-power state (e.g., a sleep mode), which may result in greater power savings at the device 705.

Figure 8:
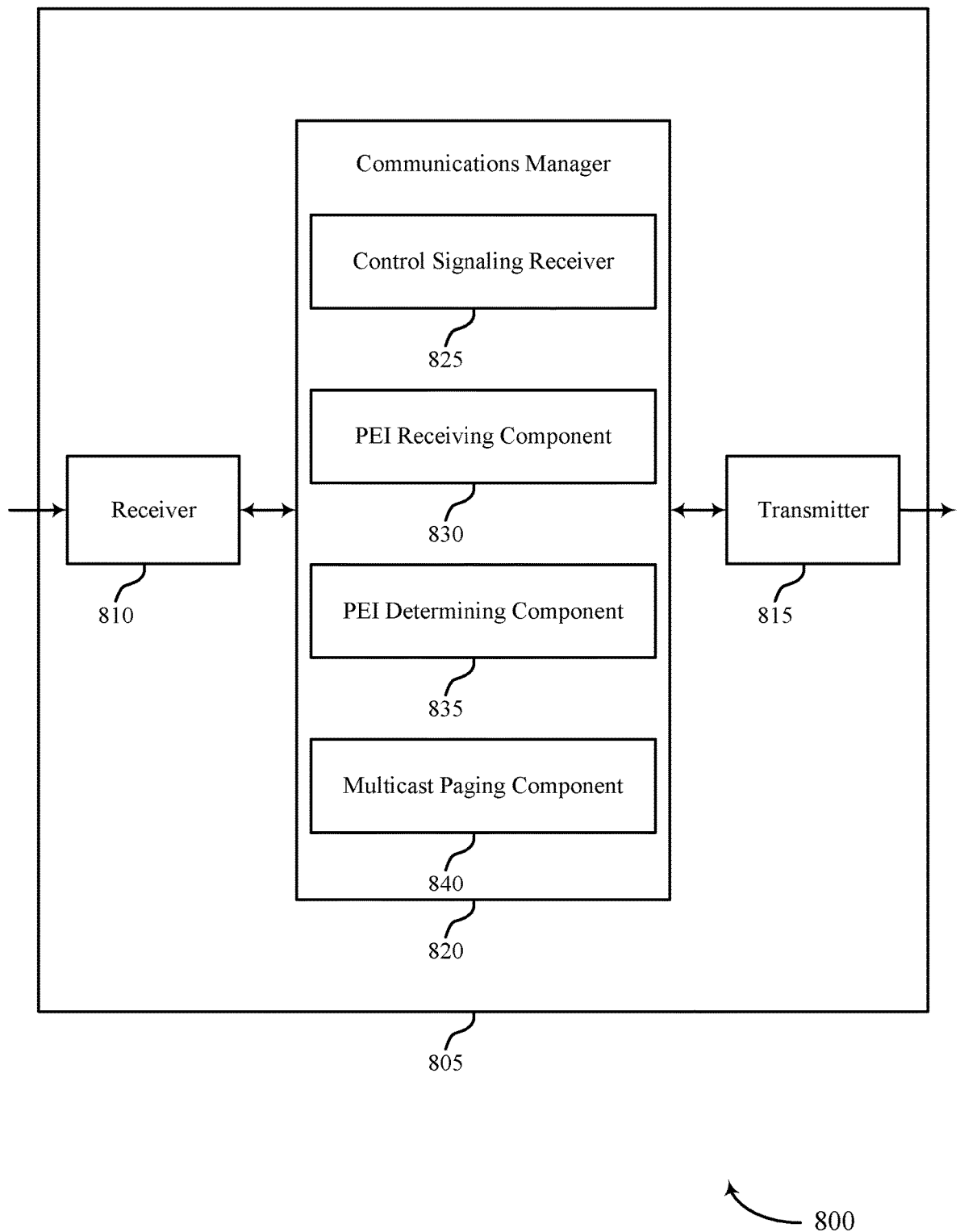

FIG. 8 shows a block diagram 800 of a device 805 that supports PEI for multicast group notification in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to PEI for multicast group notification). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to PEI for multicast group notification). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of PEI for multicast group notification as described herein. For example, the communications manager 820 may include a control signaling receiver 825, a PEI receiving component 830, a PEI determining component 835, a multicast paging component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at the device 805 in accordance with examples as disclosed herein. The control signaling receiver 825 may be configured as or otherwise support a means for receiving, from a base station, control signaling that indicates one or more parameters pertaining to reception of PEIs at the device 805. The PEI receiving component 830 may be configured as or otherwise support a means for receiving a PEI from the base station in accordance with the one or more parameters. The PEI determining component 835 may be configured as or otherwise support a means for determining, based on the one or more parameters, that at least a part of the PEI pertains to a group of UEs that is subscribed to one or more multicast services, where the device 805 is one of the group of UEs. The multicast paging component 840 may be configured as or otherwise support a means for monitoring for a multicast paging message from the base station based on the PEI pertaining to the group of UEs.

Figure 9:
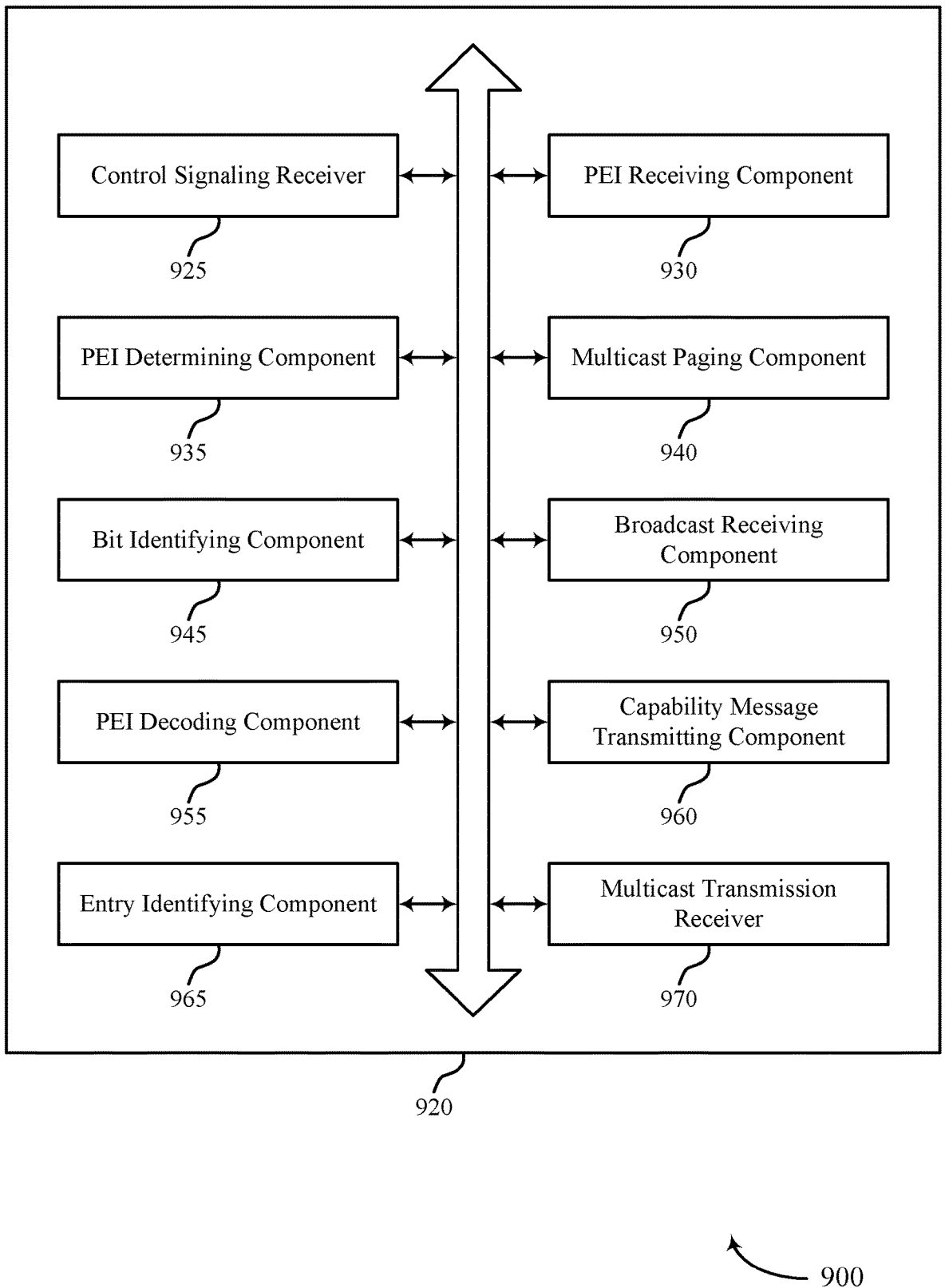
FIG. 9 shows a block diagram of a communications manager that supports PEI for multicast group notification in accordance with aspects of the present disclosure.

FIG. 9 shows a block diagram 900 of a communications manager 920 that supports PEI for multicast group notification in accordance with aspects of the present disclosure. The communications manager 920 may be an example of aspects of a communications manager 720, a communications manager 820, or both, as described herein. The communications manager 920, or various components thereof, may be an example of means for performing various aspects of PEI for multicast group notification as described herein. For example, the communications manager 920 may include a control signaling receiver 925, a PEI receiving component 930, a PEI determining component 935, a multicast paging component 940, a bit identifying component 945, a broadcast receiving component 950, a PEI decoding component 955, a capability message transmitting component 960, an entry identifying component 965, a multicast transmission receiver 970, or any combination thereof. Each of these components may communicate, directly or indirectly, with one another (e.g., via one or more buses).

The communications manager 920 may support wireless communications at the device 905 in accordance with examples as disclosed herein. The control signaling receiver 925 may be configured as or otherwise support a means for receiving, from a base station, control signaling that indicates one or more parameters pertaining to reception of PEIs at the device 905. The PEI receiving component 930 may be configured as or otherwise support a means for receiving a PEI from the base station in accordance with the one or more parameters. The PEI determining component 935 may be configured as or otherwise support a means for determining, based on the one or more parameters, that at least a part of the PEI pertains to a group of UEs that is subscribed to one or more multicast services, where the device 905 is one of the group of UEs. The multicast paging component 940 may be configured as or otherwise support a means for monitoring for a multicast paging message from the base station based on the PEI pertaining to the group of UEs.

In some examples, to support determining that at least a part of the PEI pertains to the group of UEs, the bit identifying component 945 may be configured as or otherwise support a means for identifying, based on the one or more parameters, one or more bits in the PEI that indicate the multicast paging message. In some examples, to support determining that at least a part of the PEI pertains to the group of UEs, the PEI determining component 935 may be configured as or otherwise support a means for determining, based on the one or more bits, that the group of UEs is scheduled to receive the multicast paging message from the base station during a PO associated with the multicast paging message.

In some examples, to support receiving the PEI, the broadcast receiving component 950 may be configured as or otherwise support a means for receiving, from the base station, one or more broadcast messages in a CFR. In some examples, to support receiving the PEI, the PEI receiving component 930 may be configured as or otherwise support a means for receiving the PEI in a control resource set of the CFR, where determining that at least a part of the PEI pertains to the group of UEs is based on receiving the PEI in the control resource set.

In some examples, to support determining that at least a part of the PEI pertains to the group of UEs, the PEI decoding component 955 may be configured as or otherwise support a means for decoding the PEI based on a RNTI associated with the multicast paging message. In some examples, to support determining that at least a part of the PEI pertains to the group of UEs, the PEI determining component 935 may be configured as or otherwise support a means for determining, based on decoding the PEI, that the group of UEs is scheduled to receive the multicast paging message from the base station in a PO associated with the multicast paging message.

In some examples, the PEI determining component 935 may be configured as or otherwise support a means for determining, based on the one or more parameters, that at least a part of the PEI pertains to a second paging message for a second UE in the group of UEs.

In some examples, to support determining that at least a part of the PEI pertains to the group of UEs, the entry identifying component 965 may be configured as or otherwise support a means for identifying, based on the one or more parameters, a first entry in the PEI that indicates the multicast paging message, a second entry in the PEI that indicates the second paging message, or both. In some examples, to support determining that at least a part of the PEI pertains to the group of UEs, the PEI determining component 935 may be configured as or otherwise support a means for determining, based on the first entry, that the group of UEs is scheduled to receive the multicast paging message from the base station during a PO associated with the multicast paging message.

In some examples, to support receiving the PEI, the PEI receiving component 930 may be configured as or otherwise support a means for receiving the PEI in a first monitoring occasion associated with the multicast paging message, where the first monitoring occasion is different from a second monitoring occasion associated with the second paging message.

In some examples, to support receiving the PEI, the PEI receiving component 930 may be configured as or otherwise support a means for receiving the PEI in a first set of symbols associated with the multicast paging message, where the first set of symbols is different from a second set of symbols associated with the second paging message, and where the first set of symbols and the second set of symbols correspond to a same monitoring occasion.

In some examples, to support determining that at least a part of the PEI pertains to the group of UEs, the PEI determining component 935 may be configured as or otherwise support a means for determining that the group of UEs is scheduled to receive the multicast paging message from the base station based on receiving the PEI in the first set of symbols associated with the multicast paging message.

In some examples, to support receiving the PEI, the PEI receiving component 930 may be configured as or otherwise support a means for receiving, from the base station, one or more synchronization signals or reference signals indicating the PEI, where determining that at least a part of the PEI pertains to the group of UEs is based on a sequence associated with the one or more synchronization signals or reference signals. In some examples, to support receiving the PEI, the PEI receiving component 930 may be configured as or otherwise support a means for receiving a PDCCH transmission including the PEI.

In some examples, the multicast paging component 940 may be configured as or otherwise support a means for receiving the multicast paging message from the base station in a PO associated with the multicast paging message, where the multicast paging message includes a multicast activation notification.

In some examples, the multicast transmission receiver 970 may be configured as or otherwise support a means for receiving a multicast transmission from the base station based on receiving the multicast paging message in the PO associated with the multicast paging message.

In some examples, to support receiving the control signaling, the control signaling receiver 925 may be configured as or otherwise support a means for receiving, from the base station, a SIB or a MCCH transmission that indicates the one or more parameters.

In some examples, the capability message transmitting component 960 may be configured as or otherwise support a means for transmitting, to the base station, a capability message indicating a capability of the device 905 to receive PEIs for multicast paging messages, where receiving the PEI from the base station is based on the capability message. In some examples, the device 905 may be in an idle state or an inactive state.

Figure 10:
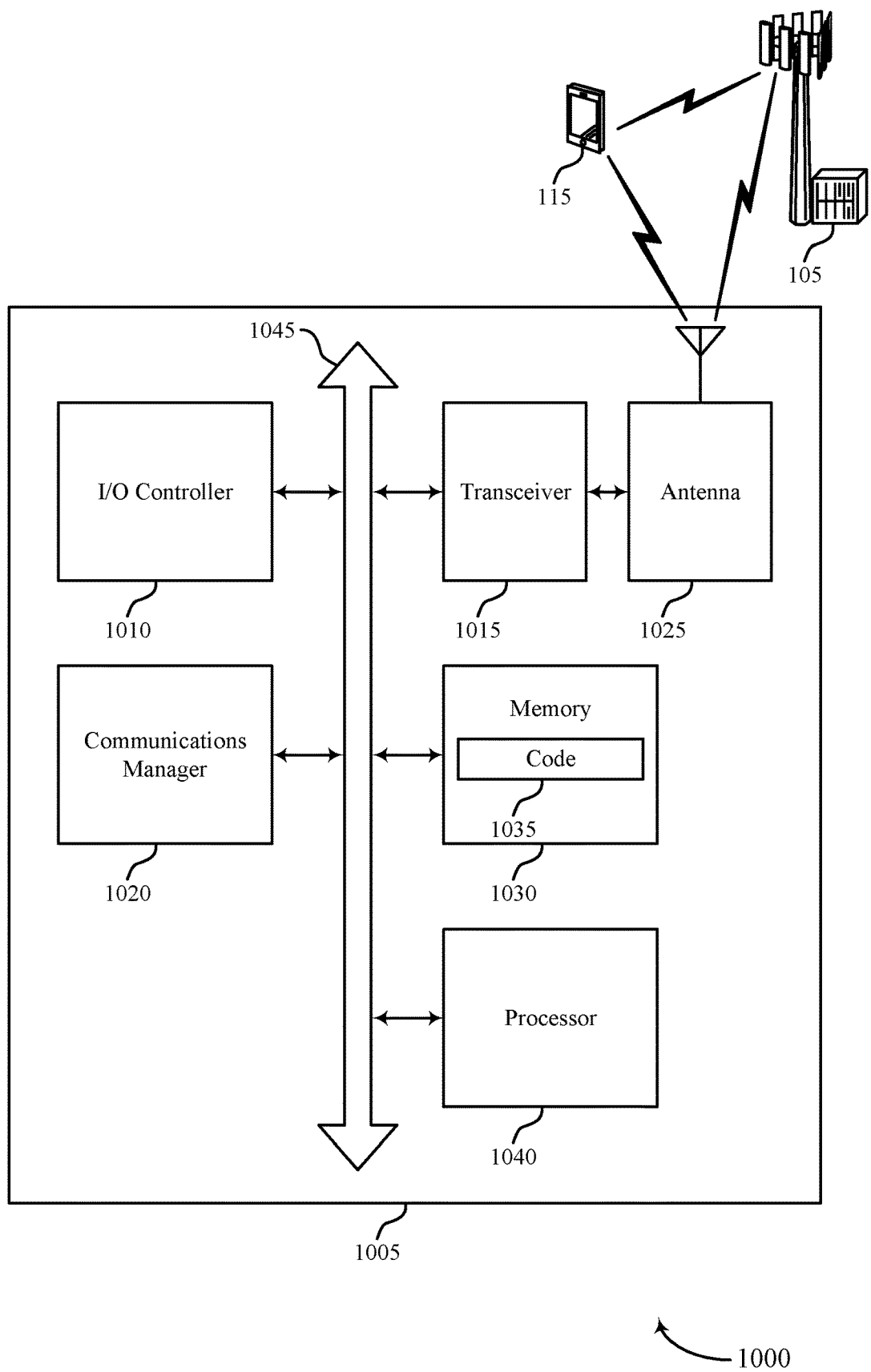
FIG. 10 shows a diagram of a system including a device that supports PEI for multicast group notification in accordance with aspects of the present disclosure.

FIG. 10 shows a diagram of a system 1000 including a device 1005 that supports PEI for multicast group notification in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting PEI for multicast group notification). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at the device 1005 in accordance with examples as disclosed herein. For example, the communications manager 1020 may be configured as or otherwise support a means for receiving, from a base station, control signaling that indicates one or more parameters pertaining to reception of PEIs at the device 1005. The communications manager 1020 may be configured as or otherwise support a means for receiving a PEI from the base station in accordance with the one or more parameters. The communications manager 1020 may be configured as or otherwise support a means for determining, based on the one or more parameters, that at least a part of the PEI pertains to a group of UEs that is subscribed to one or more multicast services, where the device 1005 is one of the group of UEs. The communications manager 1020 may be configured as or otherwise support a means for monitoring for a multicast paging message from the base station based on the PEI pertaining to the group of UEs.

By including or configuring the communications manager 1020 in accordance with examples as described herein, the device 1005 may support techniques for improved multicast paging operations with a base station 105. For example, the described techniques may enable the device 1005 to receive and decode multicast PEIs such that the device 1005 can determine, based on the multicast PEIs, whether to wake up and monitor for multicast paging messages in a subsequent PO. If the UE is not scheduled to receive any multicast paging messages in the subsequent PO, the UE can enter a low-power state and refrain from decoding paging messages in the subsequent PO.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of PEI for multicast group notification as described herein, or the processor 1040 and the memory 1030 may be otherwise configured to perform or support such operations.

Figure 11:
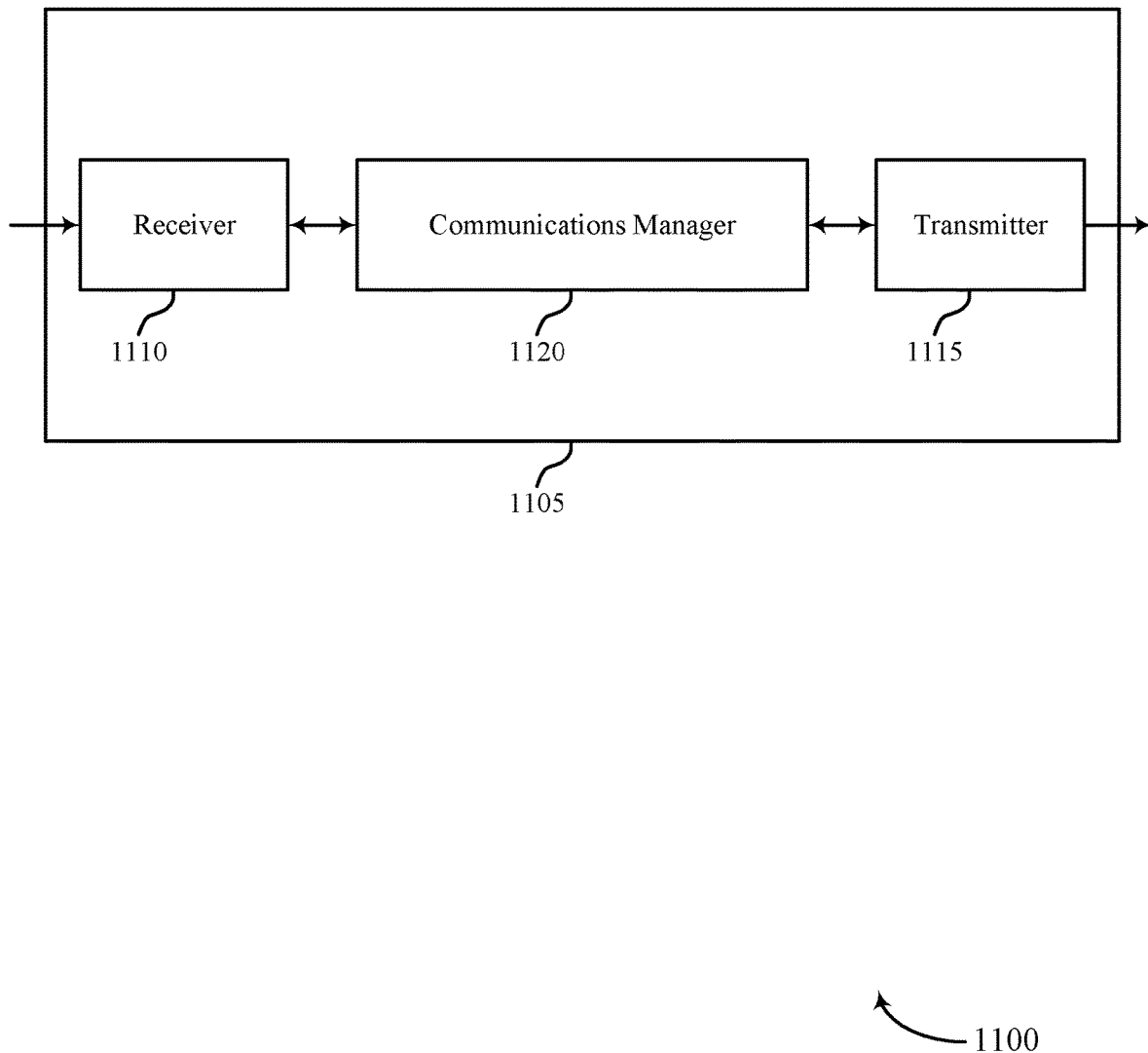
FIGS. 11 and 12 show block diagrams of devices that support PEI for multicast group notification in accordance with aspects of the present disclosure.

FIG. 11 shows a block diagram 1100 of a device 1105 that supports PEI for multicast group notification in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to PEI for multicast group notification). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to PEI for multicast group notification). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of PEI for multicast group notification as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at the device 1105 in accordance with examples as disclosed herein. For example, the communications manager 1120 may be configured as or otherwise support a means for transmitting control signaling that indicates one or more parameters pertaining to reception of PEIs. The communications manager 1120 may be configured as or otherwise support a means for transmitting a PEI in accordance with the one or more parameters, where at least a part of the PEI pertains to a group of UEs that is subscribed to one or more multicast services. The communications manager 1120 may be configured as or otherwise support a means for transmitting a multicast paging message to the group of UEs in accordance with the PEI.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for more efficient utilization of resources at the device 1105. For example, the described techniques may enable the device 1105 to indicate multicast paging messages with greater efficiency and lower signaling overhead based on transmitting a multicast PEI to a group of UEs that is scheduled to receive a multicast paging message.

Figure 12:
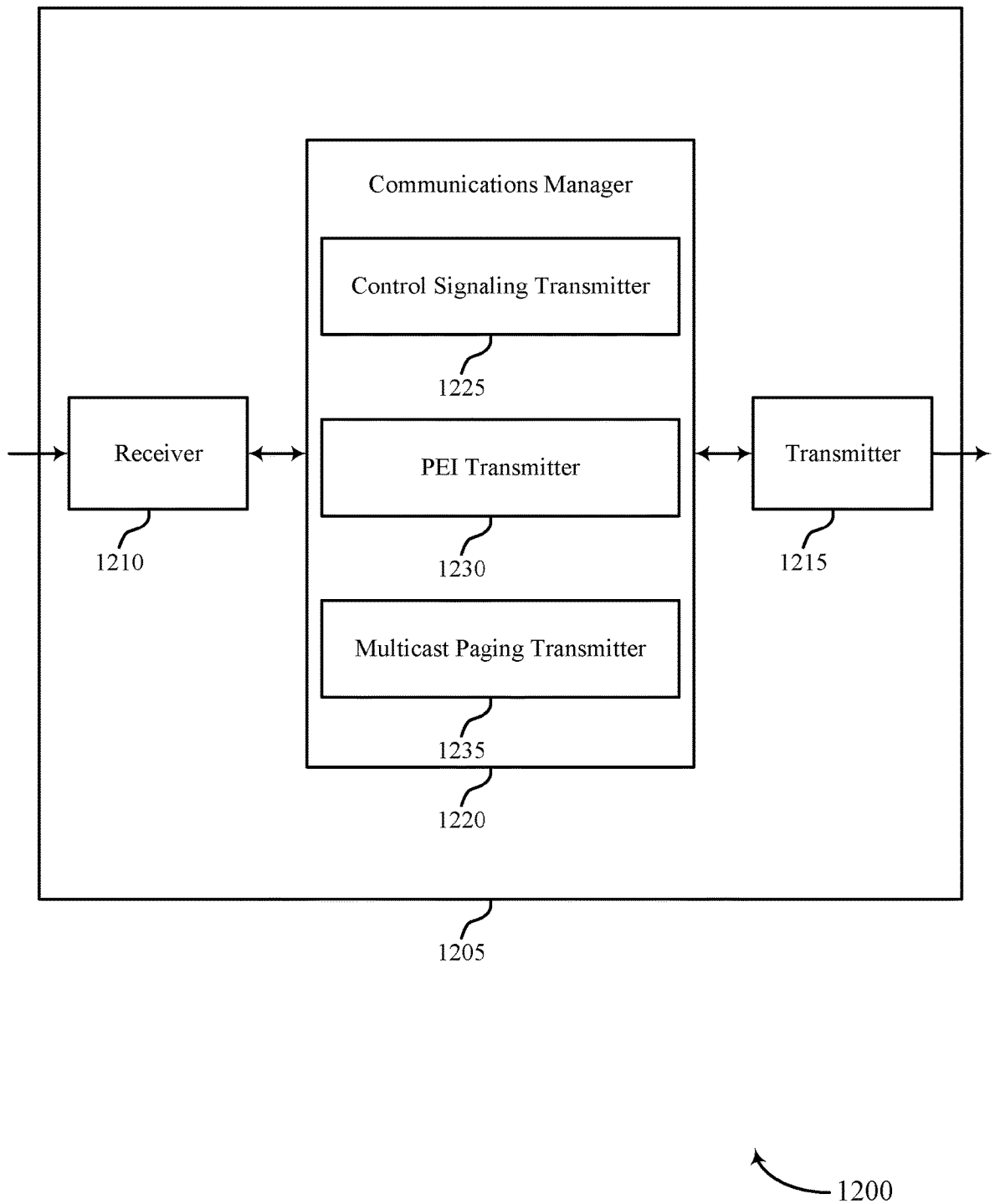

FIG. 12 shows a block diagram 1200 of a device 1205 that supports PEI for multicast group notification in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to PEI for multicast group notification). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to PEI for multicast group notification). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of PEI for multicast group notification as described herein. For example, the communications manager 1220 may include a control signaling transmitter 1225, a PEI transmitter 1230, a multicast paging transmitter 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at the device 1205 in accordance with examples as disclosed herein. The control signaling transmitter 1225 may be configured as or otherwise support a means for transmitting control signaling that indicates one or more parameters pertaining to reception of PEIs. The PEI transmitter 1230 may be configured as or otherwise support a means for transmitting a PEI in accordance with the one or more parameters, where at least a part of the PEI pertains to a group of UEs that is subscribed to one or more multicast services. The multicast paging transmitter 1235 may be configured as or otherwise support a means for transmitting a multicast paging message to the group of UEs in accordance with the PEI.

Figure 13:
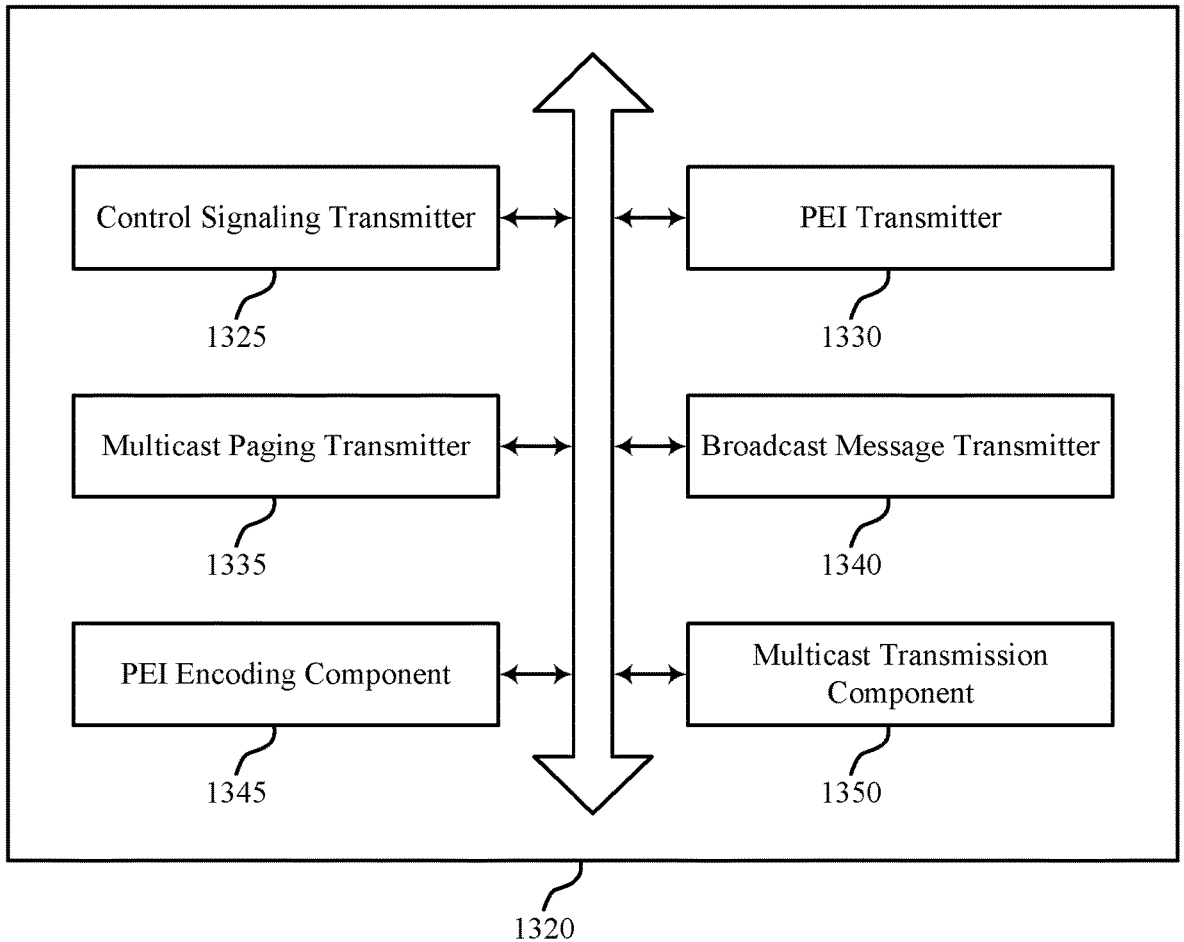
FIG. 13 shows a block diagram of a communications manager that supports PEI for multicast group notification in accordance with aspects of the present disclosure.

FIG. 13 shows a block diagram 1300 of a communications manager 1320 that supports PEI for multicast group notification in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of PEI for multicast group notification as described herein. For example, the communications manager 1320 may include a control signaling transmitter 1325, a PEI transmitter 1330, a multicast paging transmitter 1335, a broadcast message transmitter 1340, a PEI encoding component 1345, a multicast transmission component 1350, or any combination thereof. Each of these components may communicate, directly or indirectly, with one another (e.g., via one or more buses).

The communications manager 1320 may support wireless communications at the device 1305 in accordance with examples as disclosed herein. The control signaling transmitter 1325 may be configured as or otherwise support a means for transmitting control signaling that indicates one or more parameters pertaining to reception of PEIs. The PEI transmitter 1330 may be configured as or otherwise support a means for transmitting a PEI in accordance with the one or more parameters, where at least a part of the PEI pertains to a group of UEs that is subscribed to one or more multicast services. In some examples, at least a part of the PEI pertains to a second paging message for a UE in the group of UEs. The multicast paging transmitter 1335 may be configured as or otherwise support a means for transmitting a multicast paging message to the group of UEs in accordance with the PEI.

In some examples, to support transmitting the PEI, the broadcast message transmitter 1340 may be configured as or otherwise support a means for transmitting one or more broadcast messages in a CFR. In some examples, to support transmitting the PEI, the PEI transmitter 1330 may be configured as or otherwise support a means for transmitting the PEI in a control resource set of the CFR.

In some examples, to support transmitting the PEI, the PEI transmitter 1330 may be configured as or otherwise support a means for transmitting the PEI in a first monitoring occasion associated with the multicast paging message, where the first monitoring occasion is different from a second monitoring occasion associated with the second paging message.

In some examples, to support transmitting the PEI, the PEI transmitter 1330 may be configured as or otherwise support a means for transmitting the PEI in a first set of symbols associated with the multicast paging message, where the first set of symbols is different from a second set of symbols associated with the second paging message, and where the first set of symbols and the second set of symbols correspond to a same monitoring occasion.

In some examples, to support transmitting the PEI, the PEI transmitter 1330 may be configured as or otherwise support a means for transmitting the PEI via a PDCCH, where the PEI includes a first set of bits associated with the multicast paging message, a first entry associated with the multicast paging message, a second set of bits associated with the second paging message, a second entry associated with the second paging message, or a combination thereof.

In some examples, the PEI encoding component 1345 may be configured as or otherwise support a means for encoding the PEI with a RNTI associated with the multicast paging message, where transmitting the PEI is based on encoding the PEI.

In some examples, to support transmitting the multicast paging message, the multicast paging transmitter 1335 may be configured as or otherwise support a means for transmitting the multicast paging message to the group of UEs in a PO associated with the multicast paging message, where the multicast paging message includes a multicast activation notification.

In some examples, the multicast transmission component 1350 may be configured as or otherwise support a means for transmitting a multicast transmission to the group of UEs in accordance with the multicast paging message.

In some examples, to support transmitting the control signaling, the control signaling transmitter 1325 may be configured as or otherwise support a means for transmitting a SIB or a MCCH transmission that includes an indication of the one or more parameters, an indication to enable or disable PEIs for multicast paging messages, or both.

Figure 14:
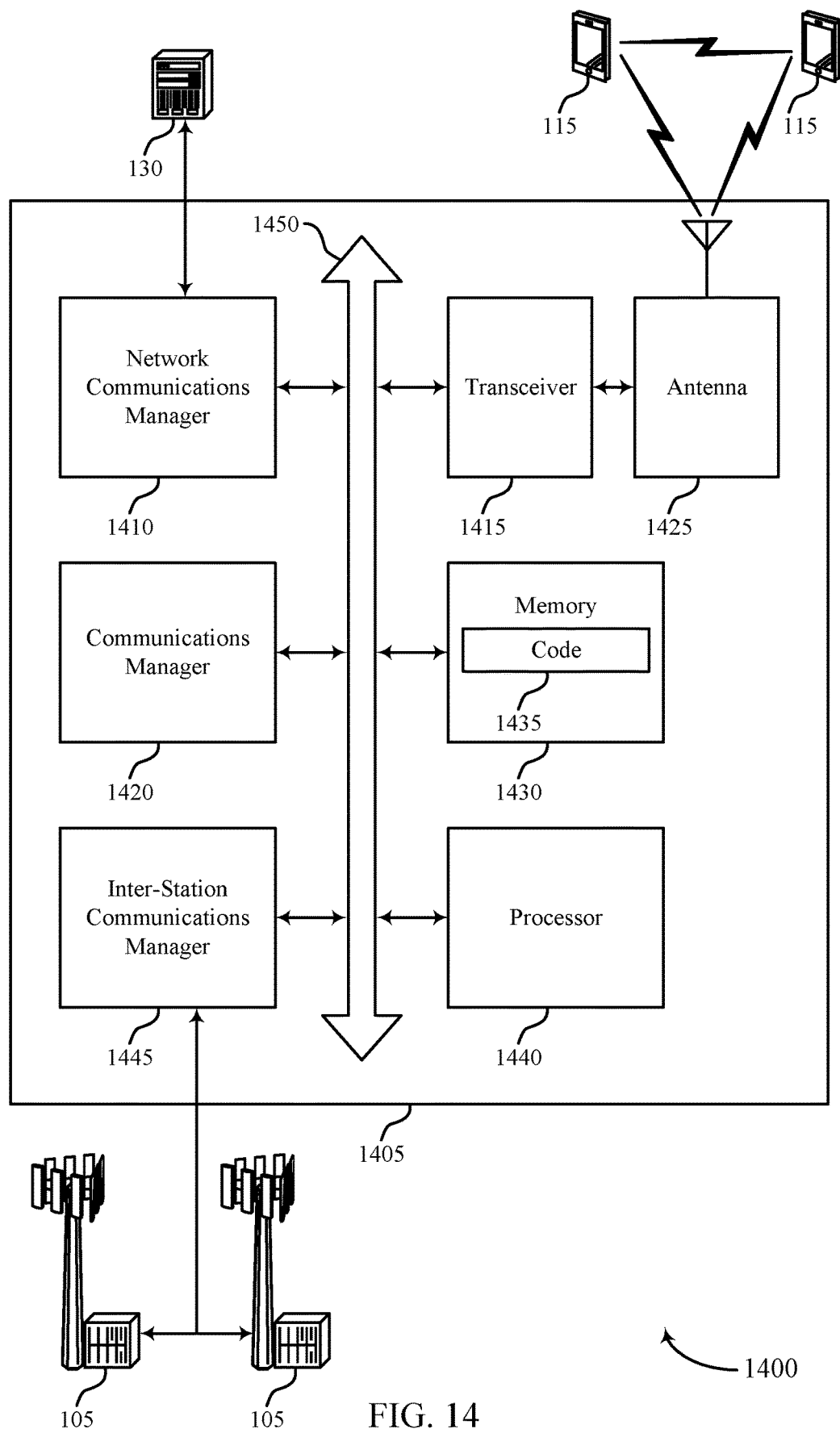
FIG. 14 shows a diagram of a system including a device that supports PEI for multicast group notification in accordance with aspects of the present disclosure.

FIG. 14 shows a diagram of a system 1400 including a device 1405 that supports PEI for multicast group notification in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting PEI for multicast group notification). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at the device 1405 in accordance with examples as disclosed herein. For example, the communications manager 1420 may be configured as or otherwise support a means for transmitting control signaling that indicates one or more parameters pertaining to reception of PEIs. The communications manager 1420 may be configured as or otherwise support a means for transmitting a PEI in accordance with the one or more parameters, where at least a part of the PEI pertains to a group of UEs that is subscribed to one or more multicast services. The communications manager 1420 may be configured as or otherwise support a means for transmitting a multicast paging message to the group of UEs in accordance with the PEI.

By including or configuring the communications manager 1420 in accordance with examples as described herein, the device 1405 may support techniques for improved multicast paging operations at the device 1405. For example, the described techniques may enable the device 1405 to indicate multicast paging messages with improved efficiency based on transmitting a multicast PEI to a group of UEs that is scheduled to receive a multicast paging message in an upcoming PO.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of PEI for multicast group notification as described herein, or the processor 1440 and the memory 1430 may be otherwise configured to perform or support such operations.

Figure 15:
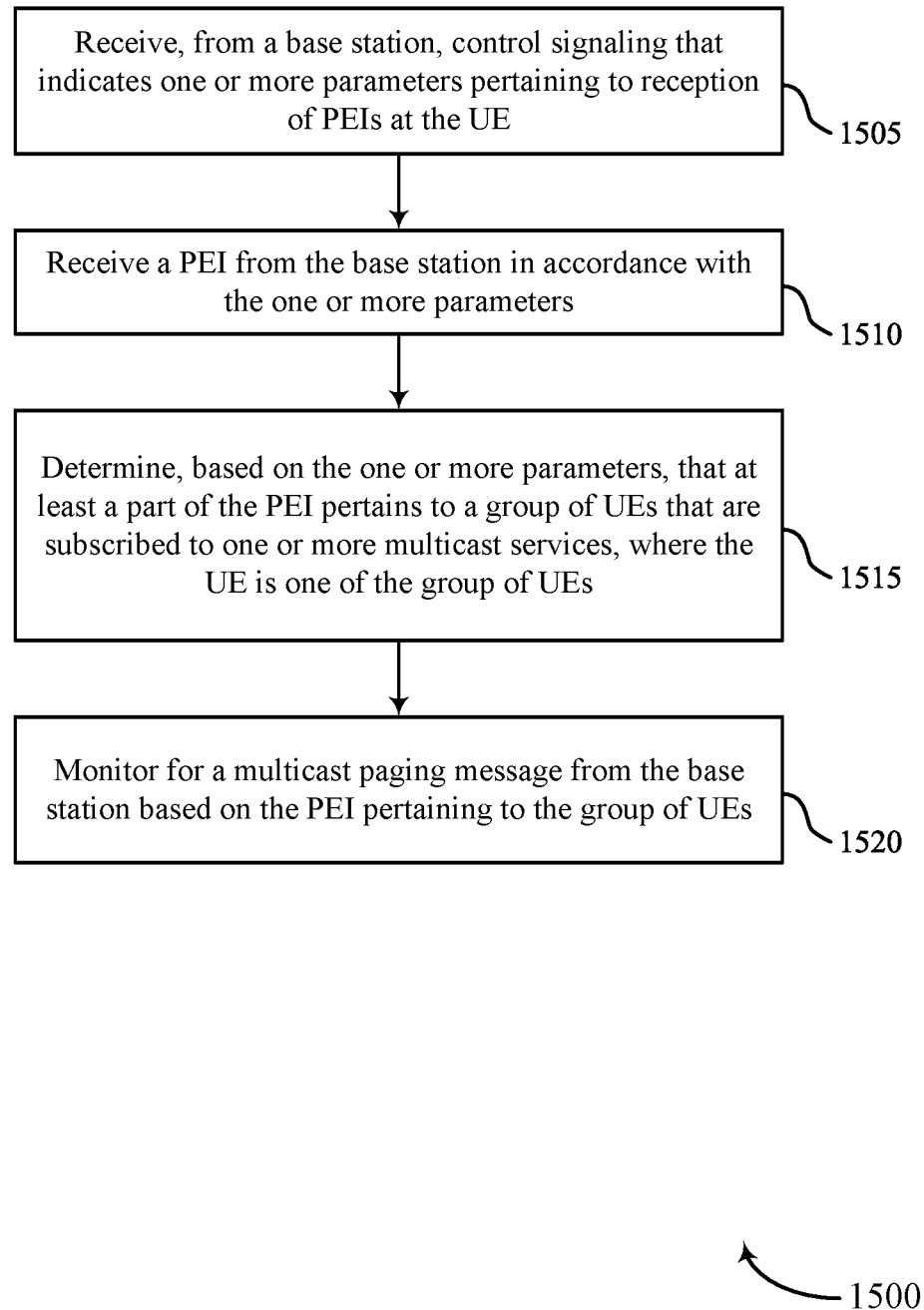
FIGS. 15 through 19 show flowcharts illustrating methods that support PEI for multicast group notification in accordance with aspects of the present disclosure.

FIG. 15 shows a flowchart illustrating a method 1500 that supports PEI for multicast group notification in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling that indicates one or more parameters pertaining to reception of PEIs at the UE. The operations of 1505 may be performed in accordance with examples as disclosed herein. In some examples, aspects of the operations of 1505 may be performed by a control signaling receiver 925 as described with reference to FIG. 9.

At 1510, the method may include receiving a PEI from the base station in accordance with the one or more parameters. The operations of 1510 may be performed in accordance with examples as disclosed herein. In some examples, aspects of the operations of 1510 may be performed by a PEI receiving component 930 as described with reference to FIG. 9.

At 1515, the method may include determining, based on the one or more parameters, that at least a part of the PEI pertains to a group of UEs that is subscribed to one or more multicast services, where the UE is one of the group of UEs. The operations of 1515 may be performed in accordance with examples as disclosed herein. In some examples, aspects of the operations of 1515 may be performed by a PEI determining component 935 as described with reference to FIG. 9.

At 1520, the method may include monitoring for a multicast paging message from the base station based on the PEI pertaining to the group of UEs. The operations of 1520 may be performed in accordance with examples as disclosed herein. In some examples, aspects of the operations of 1520 may be performed by a multicast paging component 940 as described with reference to FIG. 9.

Figure 16:
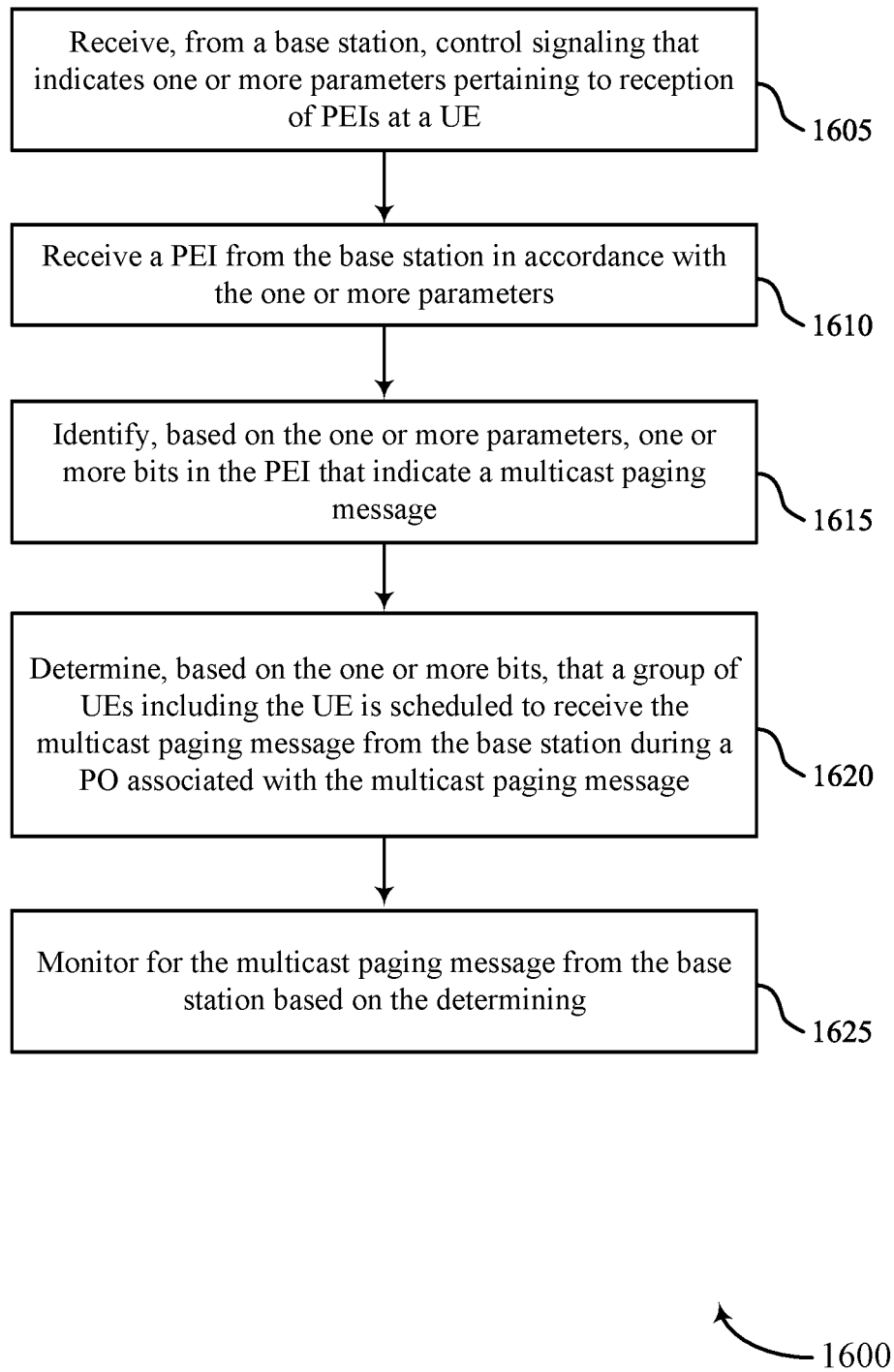

FIG. 16 shows a flowchart illustrating a method 1600 that supports PEI for multicast group notification in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling that indicates one or more parameters pertaining to reception of PEIs at the UE. The operations of 1605 may be performed in accordance with examples as disclosed herein. In some examples, aspects of the operations of 1605 may be performed by a control signaling receiver 925 as described with reference to FIG. 9.

At 1610, the method may include receiving a PEI from the base station in accordance with the one or more parameters. The operations of 1610 may be performed in accordance with examples as disclosed herein. In some examples, aspects of the operations of 1610 may be performed by a PEI receiving component 930 as described with reference to FIG. 9.

At 1615, the method may include identifying, based on the one or more parameters, one or more bits in the PEI that indicate the multicast paging message. The operations of 1615 may be performed in accordance with examples as disclosed herein. In some examples, aspects of the operations of 1615 may be performed by a bit identifying component 945 as described with reference to FIG. 9.

At 1620, the method may include determining, based on the one or more bits, that a group of UEs including the UE is scheduled to receive a multicast paging message from the base station during a PO associated with the multicast paging message. The operations of 1620 may be performed in accordance with examples as disclosed herein. In some examples, aspects of the operations of 1620 may be performed by a PEI determining component 935 as described with reference to FIG. 9.

At 1625, the method may include monitoring for a multicast paging message from the base station based on the PEI pertaining to the group of UEs. The operations of 1625 may be performed in accordance with examples as disclosed herein. In some examples, aspects of the operations of 1625 may be performed by a multicast paging component 940 as described with reference to FIG. 9.

Figure 17:
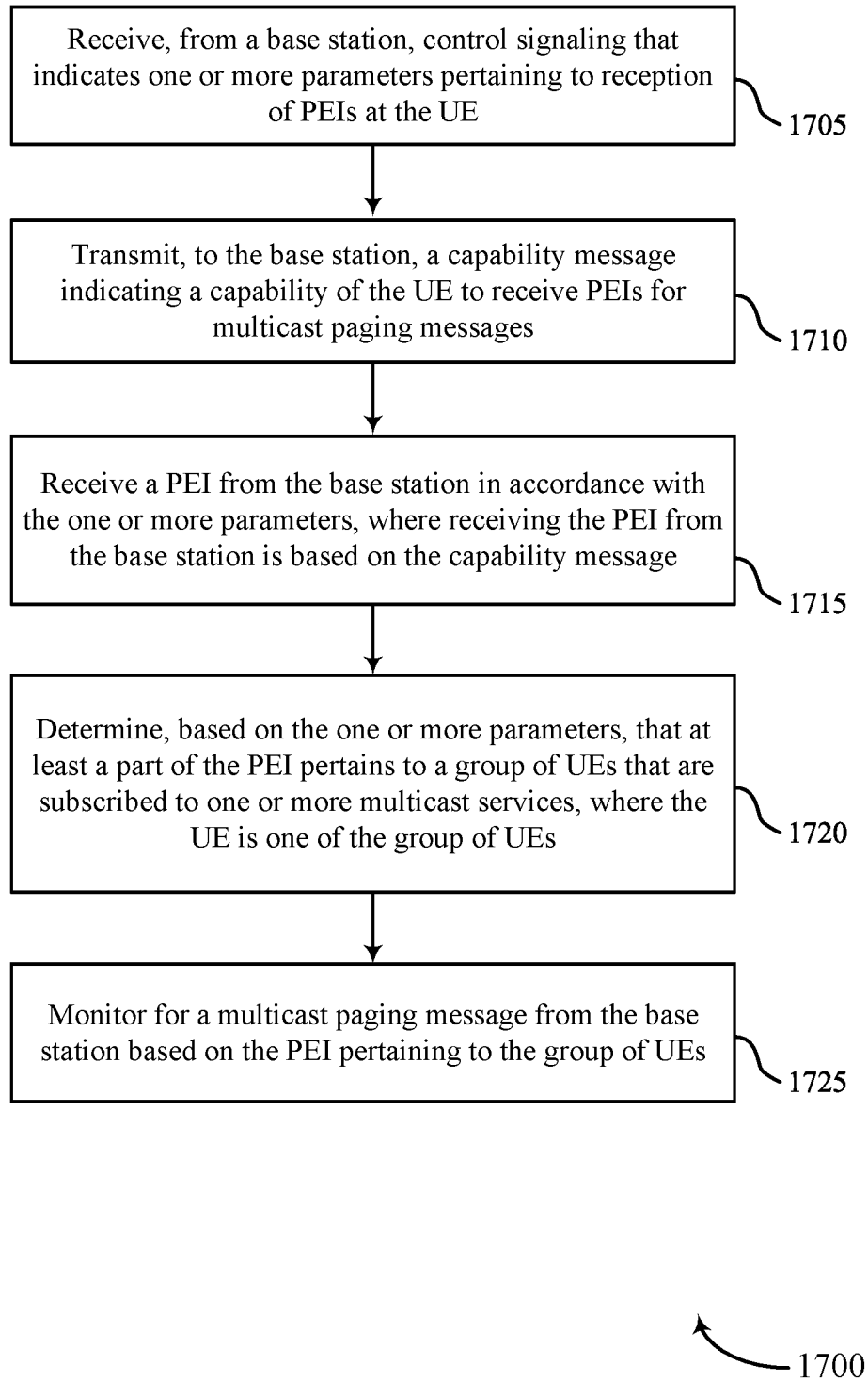

FIG. 17 shows a flowchart illustrating a method 1700 that supports PEI for multicast group notification in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, control signaling that indicates one or more parameters pertaining to reception of PEIs at the UE. The operations of 1705 may be performed in accordance with examples as disclosed herein. In some examples, aspects of the operations of 1705 may be performed by a control signaling receiver 925 as described with reference to FIG. 9.

At 1710, the method may include transmitting, to the base station, a capability message indicating a capability of the UE to receive PEIs for multicast paging messages. The operations of 1710 may be performed in accordance with examples as disclosed herein. In some examples, aspects of the operations of 1710 may be performed by a capability message transmitting component 960 as described with reference to FIG. 9.

At 1715, the method may include receiving a PEI from the base station in accordance with the one or more parameters, where receiving the PEI from the base station is based on the capability message. The operations of 1715 may be performed in accordance with examples as disclosed herein. In some examples, aspects of the operations of 1715 may be performed by a PEI receiving component 930 as described with reference to FIG. 9.

At 1720, the method may include determining, based on the one or more parameters, that at least a part of the PEI pertains to a group of UEs that is subscribed to one or more multicast services, where the UE is one of the group of UEs. The operations of 1720 may be performed in accordance with examples as disclosed herein. In some examples, aspects of the operations of 1720 may be performed by a PEI determining component 935 as described with reference to FIG. 9.

At 1725, the method may include monitoring for a multicast paging message from the base station based on the PEI pertaining to the group of UEs. The operations of 1725 may be performed in accordance with examples as disclosed herein. In some examples, aspects of the operations of 1725 may be performed by a multicast paging component 940 as described with reference to FIG. 9.

Figure 18:
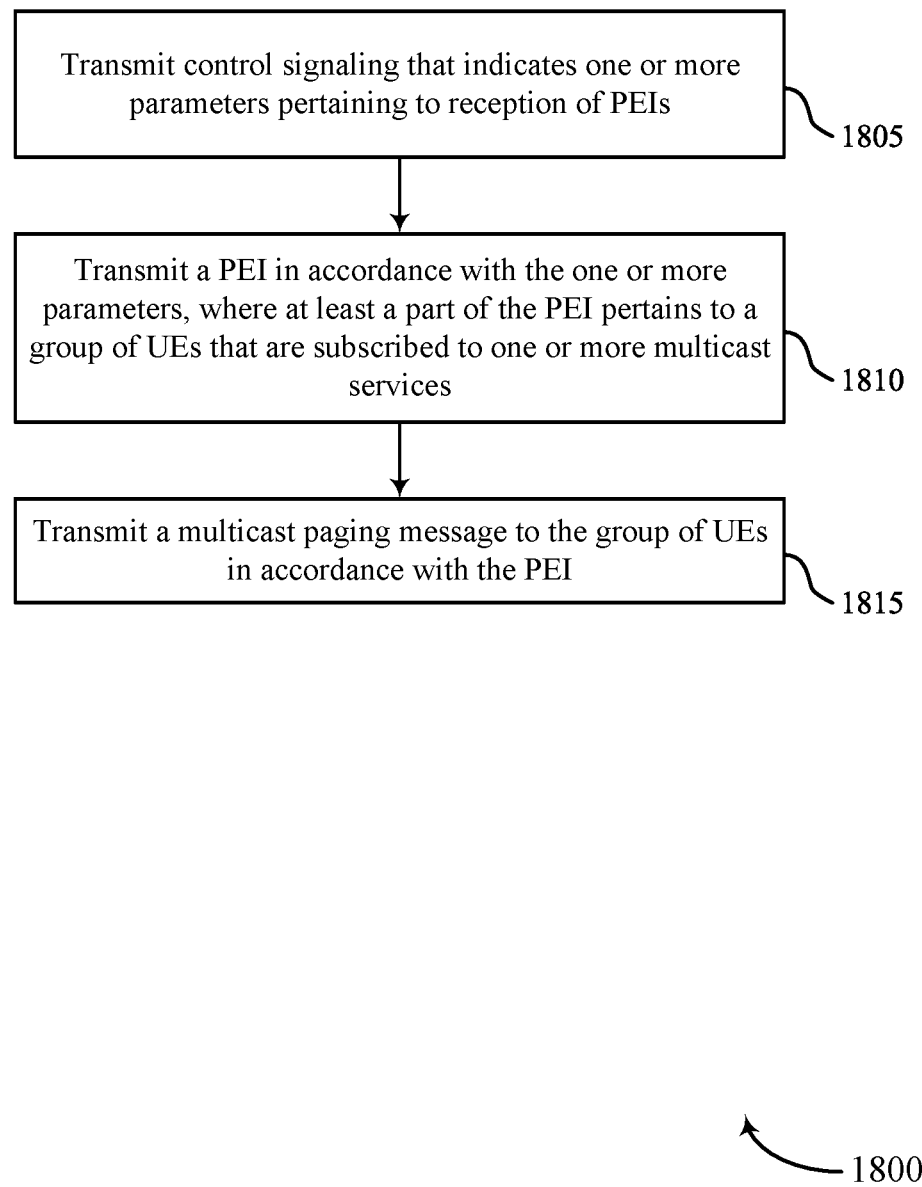

FIG. 18 shows a flowchart illustrating a method 1800 that supports PEI for multicast group notification in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting control signaling that indicates one or more parameters pertaining to reception of PEIs. The operations of 1805 may be performed in accordance with examples as disclosed herein. In some examples, aspects of the operations of 1805 may be performed by a control signaling transmitter 1325 as described with reference to FIG. 13.

At 1810, the method may include transmitting a PEI in accordance with the one or more parameters, where at least a part of the PEI pertains to a group of UEs that is subscribed to one or more multicast services. The operations of 1810 may be performed in accordance with examples as disclosed herein. In some examples, aspects of the operations of 1810 may be performed by a PEI transmitter 1330 as described with reference to FIG. 13.

At 1815, the method may include transmitting a multicast paging message to the group of UEs in accordance with the PEI. The operations of 1815 may be performed in accordance with examples as disclosed herein. In some examples, aspects of the operations of 1815 may be performed by a multicast paging transmitter 1335 as described with reference to FIG. 13.

Figure 19:
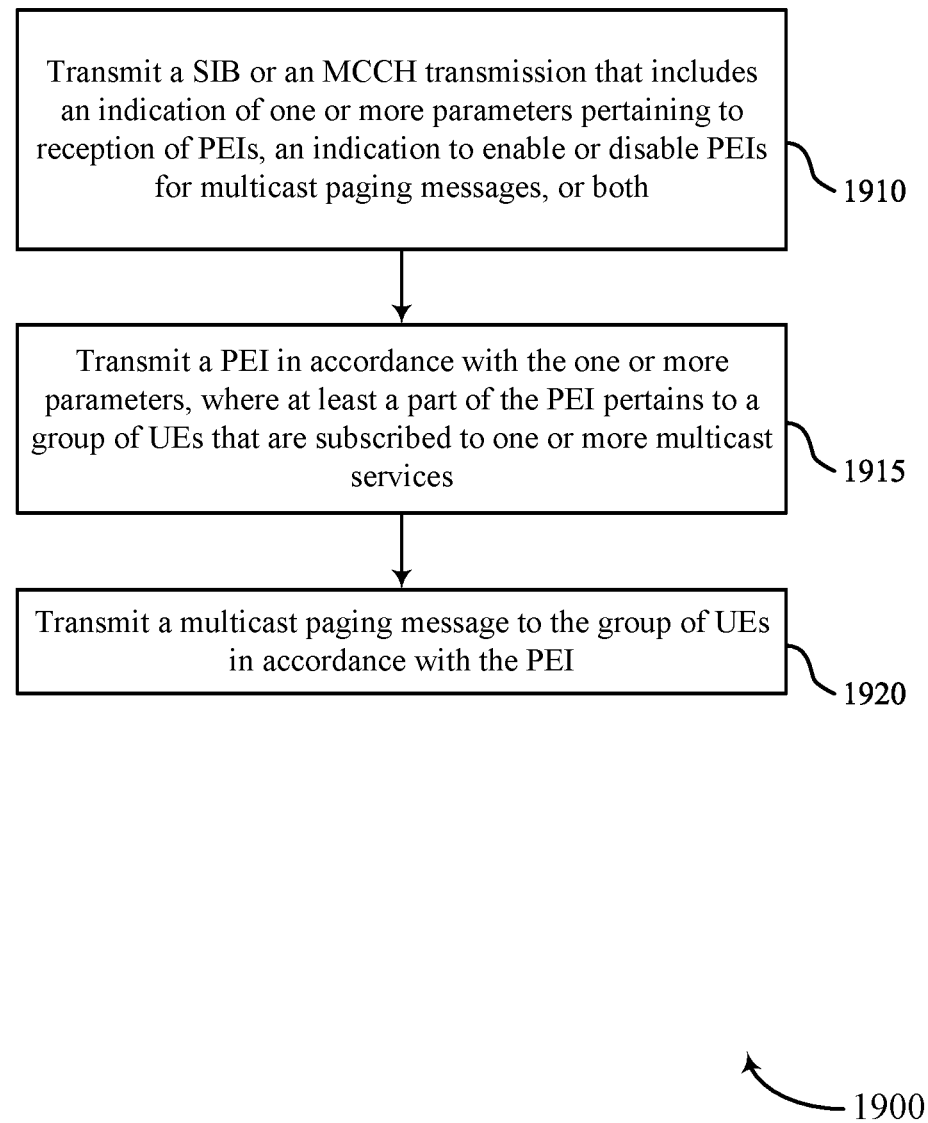

FIG. 19 shows a flowchart illustrating a method 1900 that supports PEI for multicast group notification in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1910, the method may include transmitting a SIB or a MCCH transmission that includes an indication of one or more parameters pertaining to reception of PEIs, an indication to enable or disable PEIs for multicast paging messages, or both. The operations of 1910 may be performed in accordance with examples as disclosed herein. In some examples, aspects of the operations of 1910 may be performed by a control signaling transmitter 1325 as described with reference to FIG. 13.

At 1915, the method may include transmitting a PEI in accordance with the one or more parameters, where at least a part of the PEI pertains to a group of UEs that is subscribed to one or more multicast services. The operations of 1915 may be performed in accordance with examples as disclosed herein. In some examples, aspects of the operations of 1915 may be performed by a PEI transmitter 1330 as described with reference to FIG. 13.

At 1920, the method may include transmitting a multicast paging message to the group of UEs in accordance with the PEI. The operations of 1920 may be performed in accordance with examples as disclosed herein. In some examples, aspects of the operations of 1920 may be performed by a multicast paging transmitter 1335 as described with reference to FIG. 13.

The following provides an overview of aspects of the present disclosure:

Aspect 1: A method for wireless communications at a UE, comprising: receiving, from a base station, control signaling that indicates one or more parameters pertaining to reception of paging early indications at the UE; receiving a paging early indication from the base station in accordance with the one or more parameters; determining, based at least in part on the one or more parameters, that at least a part of the paging early indication pertains to a group of UEs that are subscribed to one or more multicast services, wherein the UE is one of the group of UEs; monitoring for a multicast paging message from the base station based at least in part on the paging early indication pertaining to the group of UEs.

Aspect 2: The method of aspect 1, wherein determining that at least a part of the paging early indication pertains to the group of UEs comprises: identifying, based at least in part on the one or more parameters, one or more bits in the paging early indication that indicate the multicast paging message; and determining, based at least in part on the one or more bits, that the group of UEs is scheduled to receive the multicast paging message from the base station during a paging occasion associated with the multicast paging message.

Aspect 3: The method of any of aspects 1 through 2, wherein receiving the paging early indication comprises: receiving, from the base station, one or more broadcast messages in a common frequency resource; and receiving the paging early indication in a control resource set of the common frequency resource, wherein determining that at least a part of the paging early indication pertains to the group of UEs is based at least in part on receiving the paging early indication in the control resource set.

Aspect 4: The method of any of aspects 1 through 3, wherein determining that at least a part of the paging early indication pertains to the group of UEs comprises: decoding the paging early indication based at least in part on a radio network temporary identifier associated with the multicast paging message; and determining, based at least in part on decoding the paging early indication, that the group of UEs is scheduled to receive the multicast paging message from the base station in a paging occasion associated with the multicast paging message.

Aspect 5: The method of any of aspects 1 through 4, further comprising: determining, based at least in part on the one or more parameters, that at least a part of the paging early indication pertains to a second paging message for a second UE in the group of UEs.

Aspect 6: The method of aspect 5, wherein determining that at least a part of the paging early indication pertains to the group of UEs comprises: identifying, based at least in part on the one or more parameters, a first entry in the paging early indication that indicates the multicast paging message, a second entry in the paging early indication that indicates the second paging message, or both; and determining, based at least in part on the first entry, that the group of UEs is scheduled to receive the multicast paging message from the base station during a paging occasion associated with the multicast paging message.

Aspect 7: The method of any of aspects 5 through 6, wherein receiving the paging early indication comprises: receiving the paging early indication in a first monitoring occasion associated with the multicast paging message, wherein the first monitoring occasion is different from a second monitoring occasion associated with the second paging message.

Aspect 8: The method of any of aspects 5 through 7, wherein receiving the paging early indication comprises: receiving the paging early indication in a first set of symbols associated with the multicast paging message, wherein the first set of symbols is different from a second set of symbols associated with the second paging message, and wherein the first set of symbols and the second set of symbols correspond to a same monitoring occasion.

Aspect 9: The method of aspect 8, wherein determining that at least a part of the paging early indication pertains to the group of UEs comprises: determining that the group of UEs is scheduled to receive the multicast paging message from the base station based at least in part on receiving the paging early indication in the first set of symbols associated with the multicast paging message.

Aspect 10: The method of any of aspects 1 through 9, wherein receiving the paging early indication comprises: receiving, from the base station, one or more synchronization signals or reference signals indicating the paging early indication, wherein determining that at least a part of the paging early indication pertains to the group of UEs is based at least in part on a sequence associated with the one or more synchronization signals or reference signals.

Aspect 11: The method of any of aspects 1 through 9, wherein receiving the paging early indication comprises: receiving a physical downlink control channel transmission comprising the paging early indication.

Aspect 12: The method of any of aspects 1 through 11, further comprising: receiving the multicast paging message from the base station in a paging occasion associated with the multicast paging message, wherein the multicast paging message comprises a multicast activation notification.

Aspect 13: The method of aspect 12, further comprising: receiving a multicast transmission from the base station based at least in part on receiving the multicast paging message in the paging occasion associated with the multicast paging message.

Aspect 14: The method of any of aspects 1 through 13, wherein receiving the control signaling comprises: receiving, from the base station, a system information block or a multicast control channel transmission that indicates the one or more parameters.

Aspect 15: The method of any of aspects 1 through 14, wherein the UE is in an idle state or an inactive state.

Aspect 16: The method of any of aspects 1 through 15, further comprising: transmitting, to the base station, a capability message indicating a capability of the UE to receive paging early indications for multicast paging messages, wherein receiving the paging early indication from the base station is based at least in part on the capability message.

Aspect 17: A method for wireless communications at a base station, comprising: transmitting control signaling that indicates one or more parameters pertaining to reception of paging early indications; transmitting a paging early indication in accordance with the one or more parameters, wherein at least a part of the paging early indication pertains to a group of UEs that are subscribed to one or more multicast services; and transmitting a multicast paging message to the group of UEs in accordance with the paging early indication.

Aspect 18: The method of aspect 17, wherein transmitting the paging early indication comprises: transmitting one or more broadcast messages in a common frequency resource;

and transmitting the paging early indication in a control resource set of the common frequency resource.

Aspect 19: The method of any of aspects 17 through 18, wherein at least a part of the paging early indication pertains to a second paging message for a UE in the group of UEs.

Aspect 20: The method of aspect 19, wherein transmitting the paging early indication comprises: transmitting the paging early indication in a first monitoring occasion associated with the multicast paging message, wherein the first monitoring occasion is different from a second monitoring occasion associated with the second paging message.

Aspect 21: The method of any of aspects 19 through 20, wherein transmitting the paging early indication comprises: transmitting the paging early indication in a first set of symbols associated with the multicast paging message, wherein the first set of symbols is different from a second set of symbols associated with the second paging message, and wherein the first set of symbols and the second set of symbols correspond to a same monitoring occasion.

Aspect 22: The method of any of aspects 19 through 21, wherein transmitting the paging early indication comprises: transmitting the paging early indication via a physical downlink control channel, wherein the paging early indication comprises a first set of bits associated with the multicast paging message, a first entry associated with the multicast paging message, a second set of bits associated with the second paging message, a second entry associated with the second paging message, or a combination thereof.

Aspect 23: The method of any of aspects 17 through 22, further comprising: encoding the paging early indication with a radio network temporary identifier associated with the multicast paging message, wherein transmitting the paging early indication is based at least in part on encoding the paging early indication.

Aspect 24: The method of any of aspects 17 through 23, wherein transmitting the multicast paging message comprises: transmitting the multicast paging message to the group of UEs in a paging occasion associated with the multicast paging message, wherein the multicast paging message comprises a multicast activation notification.

Aspect 25: The method of aspect 24, further comprising: transmitting a multicast transmission to the group of UEs in accordance with the multicast paging message.

Aspect 26: The method of any of aspects 17 through 25, wherein transmitting the control signaling comprises: transmitting a system information block or a multicast control channel transmission that comprises an indication of the one or more parameters, an indication to enable or disable paging early indications for multicast paging messages, or both.

Aspect 27: An apparatus for wireless communications at a UE, comprising a processor; memory coupled with the processor; and instructions stored in the memory and executable by the processor to cause the apparatus to perform a method of any of aspects 1 through 16.

Aspect 28: An apparatus for wireless communications at a UE, comprising at least one means for performing a method of any of aspects 1 through 16.

Aspect 29: A non-transitory computer-readable medium storing code for wireless communications at a UE, the code comprising instructions executable by a processor to perform a method of any of aspects 1 through 16.

Aspect 30: An apparatus for wireless communications at a base station, comprising a processor; memory coupled with the processor; and instructions stored in the memory and executable by the processor to cause the apparatus to perform a method of any of aspects 17 through 26.

Aspect 31: An apparatus for wireless communications at a base station, comprising at least one means for performing a method of any of aspects 17 through 26.

Aspect 32: A non-transitory computer-readable medium storing code for wireless communications at a base station, the code comprising instructions executable by a processor to perform a method of any of aspects 17 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving control signaling that indicates one or more parameters pertaining to reception of paging early indications, wherein the control signaling comprises a system information block, a multicast control channel transmission, or both;
   receiving a paging early indication in accordance with the one or more parameters;
   determining, based at least in part on the one or more parameters, that at least a part of the paging early indication pertains to a multicast paging message for a group of UEs that is subscribed to one or more multicast services, wherein the UE is one of the group of UEs, and at least a part of the paging early indication pertains to a unicast paging message for a second UE in the group of UEs, wherein the determining is based at least in part on identifying one or more first bits in the paging early indication that indicate the multicast paging message and identifying one or more second bits in the paging early indication that indicate the unicast paging message;
   monitoring for the multicast paging message based at least in part on the paging early indication pertaining to the group of UEs; and
   receiving a multicast transmission based at least in part on receiving the multicast paging message.

2. The method of claim 1, wherein determining that at least a part of the paging early indication pertains to the group of UEs comprises:
   identifying, based at least in part on the one or more parameters, the one or more first bits in the paging early indication that indicate the multicast paging message; and
   determining, based at least in part on the one or more first bits, that the group of UEs is scheduled to receive the multicast paging message during a paging occasion associated with the multicast paging message.

3. The method of claim 1, wherein receiving the paging early indication comprises:
   receiving, one or more broadcast messages in a common frequency resource; and
   receiving the paging early indication in a control resource set of the common frequency resource, wherein determining that at least a part of the paging early indication pertains to the group of UEs is based at least in part on receiving the paging early indication in the control resource set.

4. The method of claim 1, wherein determining that at least a part of the paging early indication pertains to the group of UEs comprises:
   decoding the paging early indication based at least in part on a radio network temporary identifier associated with the multicast paging message; and determining, based at least in part on decoding the paging early indication, that the group of UEs is scheduled to receive the multicast paging message in a paging occasion associated with the multicast paging message.

5. The method of claim 1, wherein determining that at least a part of the paging early indication pertains to the group of UEs comprises:
identifying, based at least in part on the one or more parameters, a first entry in the paging early indication that indicates the multicast paging message, a second entry in the paging early indication that indicates the unicast paging message, or both; and
determining, based at least in part on the first entry, that the group of UEs is scheduled to receive the multicast paging message during a paging occasion associated with the multicast paging message.

6. The method of claim 1, wherein receiving the paging early indication comprises:
receiving the paging early indication in a first monitoring occasion associated with the multicast paging message, wherein the first monitoring occasion is different from a second monitoring occasion associated with the unicast paging message.

7. The method of claim 1, wherein receiving the paging early indication comprises:
receiving the paging early indication in a first set of symbols associated with the multicast paging message, wherein the first set of symbols is different from a second set of symbols associated with the unicast paging message, and wherein the first set of symbols and the second set of symbols correspond to a same monitoring occasion.

8. The method of claim 7, wherein determining that at least a part of the paging early indication pertains to the group of UEs comprises:
determining that the group of UEs is scheduled to receive the multicast paging message based at least in part on receiving the paging early indication in the first set of symbols associated with the multicast paging message.

9. The method of claim 1, wherein receiving the paging early indication comprises:
receiving one or more synchronization signals or reference signals indicating the paging early indication, wherein determining that at least a part of the paging early indication pertains to the group of UEs is based at least in part on a sequence associated with the one or more synchronization signals or reference signals.

10. The method of claim 1, wherein receiving the paging early indication comprises:
receiving a physical downlink control channel transmission comprising the paging early indication.

11. The method of claim 1, further comprising:
receiving the multicast paging message in a paging occasion associated with the multicast paging message, wherein the multicast paging message comprises a multicast activation notification.

12. The method of claim 1, wherein
the system information block, the multicast control channel transmission, or both indicate the one or more parameters.

13. The method of claim 1, wherein the UE is in an idle state or an inactive state.

14. The method of claim 1, further comprising:
transmitting a capability message indicating a capability of the UE to receive paging early indications for multicast paging messages, wherein receiving the paging early indication is based at least in part on the capability message.

15. A method for wireless communications at a network device, comprising:
transmitting control signaling that indicates one or more parameters pertaining to reception of paging early indications, wherein the control signaling comprises a system information block, a multicast control channel transmission, or both;
transmitting a paging early indication in accordance with the one or more parameters, wherein at least a part of the paging early indication pertains to a multicast paging message for a group of UEs that is subscribed to one or more multicast services and at least a part of the paging early indication pertains to a unicast paging message for a UE in the group of UEs, wherein one or more first bits in the paging early indication indicate the multicast paging message and one or more second bits in the paging early indication indicate the unicast paging message;
transmitting a multicast paging message in accordance with the paging early indication; and
transmitting a multicast transmission in accordance with the multicast paging message.

16. The method of claim 15, wherein transmitting the paging early indication comprises:
transmitting one or more broadcast messages in a common frequency resource; and
transmitting the paging early indication in a control resource set of the common frequency resource.

17. The method of claim 15, wherein transmitting the paging early indication comprises:
transmitting the paging early indication in a first monitoring occasion associated with the multicast paging message, wherein the first monitoring occasion is different from a second monitoring occasion associated with the unicast paging message.

18. The method of claim 15, wherein transmitting the paging early indication comprises:
transmitting the paging early indication in a first set of symbols associated with the multicast paging message, wherein the first set of symbols is different from a second set of symbols associated with the unicast paging message, and wherein the first set of symbols and the second set of symbols correspond to a same monitoring occasion.

19. The method of claim 15, wherein transmitting the paging early indication comprises:
transmitting the paging early indication via a physical downlink control channel, wherein the paging early indication comprises a first entry associated with the multicast paging message, a second entry associated with the unicast paging message, or a combination thereof.

20. The method of claim 15, further comprising:
encoding the paging early indication with a radio network temporary identifier associated with the multicast paging message, wherein transmitting the paging early indication is based at least in part on encoding the paging early indication.

21. The method of claim 15, wherein transmitting the multicast paging message comprises:
transmitting the multicast paging message in a paging occasion associated with the multicast paging message, wherein the multicast paging message comprises a multicast activation notification.

22. The method of claim 15, wherein
the system information block, the multicast control channel transmission, or both comprise an indication of the one or more parameters, an indication to enable or disable paging early indications for multicast paging messages, or both.

23. An apparatus for wireless communications, comprising:
one or more processors;
memory coupled with the one or more processors; and
instructions stored in the memory and executable by the one or more processors to cause the apparatus to:
receive control signaling that indicates one or more parameters pertaining to reception of paging early indications at a user equipment (UE), wherein the control signaling comprises a system information block, a multicast control channel transmission, or both;
receive a paging early indication in accordance with the one or more parameters;
determine, based at least in part on the one or more parameters, that at least a part of the paging early indication pertains to a multicast paging message for a group of UEs that is subscribed to one or more multicast services, wherein the UE is one of the group of UEs, and at least a part of the paging early indication pertains to a unicast paging message for a second UE in the group of UEs, wherein the determining is based at least in part on identifying one or more first bits in the paging early indication that indicate the multicast paging message and identifying one or more second bits in the paging early indication that indicate the unicast paging message;
monitor for a multicast paging message based at least in part on the paging early indication pertaining to the group of UEs; and
receive a multicast transmission based at least in part on receiving the multicast paging message.

24. The apparatus of claim 23, wherein the instructions to determine that at least a part of the paging early indication pertains to the group of UEs are executable by the one or more processors to cause the apparatus to:
identify, based at least in part on the one or more parameters, the one or more first bits in the paging early indication that indicate the multicast paging message; and
determine, based at least in part on the one or more first bits, that the group of UEs is scheduled to receive the multicast paging message during a paging occasion associated with the multicast paging message.

25. The apparatus of claim 23, wherein the instructions to receive the paging early indication are executable by the one or more processors to cause the apparatus to:
receive one or more broadcast messages in a common frequency resource; and
receive the paging early indication in a control resource set of the common frequency resource, wherein determining that at least a part of the paging early indication pertains to the group of UEs is based at least in part on receiving the paging early indication in the control resource set.

26. An apparatus for wireless communications, comprising:
one or more processors;
memory coupled with the one or more processors; and
instructions stored in the memory and executable by the one or more processors to cause the apparatus to:
transmit control signaling that indicates one or more parameters pertaining to reception of paging early indications, wherein the control signaling comprises a system information block, a multicast control channel transmission, or both;
transmit a paging early indication in accordance with the one or more parameters, wherein at least a part of the paging early indication pertains to a multicast paging message for a group of UEs that is subscribed to one or more multicast services and at least a part of the paging early indication pertains to a unicast paging message for a UE in the group of UEs, wherein or more first bits in the paging early indication indicate the multicast paging message and one or more second bits in the paging early indication indicate the unicast paging message;
transmit a multicast paging message in accordance with the paging early indication; and
transmit a multicast transmission in accordance with the multicast paging message.

\* \* \* \* \*